(12) United States Patent
Yoo et al.

(10) Patent No.: US 12,294,687 B2
(45) Date of Patent: May 6, 2025

(54) DEVICE AND METHOD FOR ACQUIRING DEPTH OF SPACE BY USING CAMERA

(71) Applicant: SAMSUNG ELECTRONICS CO., LTD., Suwon-si (KR)

(72) Inventors: Byeongwook Yoo, Suwon-si (KR); Gunill Lee, Suwon-si (KR); Wonwoo Lee, Suwon-si (KR); Jiwon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 133 days.

(21) Appl. No.: 17/975,209

(22) Filed: Oct. 27, 2022

(65) Prior Publication Data
US 2023/0037866 A1 Feb. 9, 2023

Related U.S. Application Data

(63) Continuation of application No. PCT/KR2021/005307, filed on Apr. 27, 2021.

(30) Foreign Application Priority Data

Apr. 28, 2020 (KR) .................. 10-2020-0051815

(51) Int. Cl.
*H04N 13/221* (2018.01)
*H04N 13/00* (2018.01)
(Continued)

(52) U.S. Cl.
CPC ......... *H04N 13/221* (2018.05); *H04N 13/296* (2018.05); *H04N 23/61* (2023.01);
(Continued)

(58) Field of Classification Search
None
See application file for complete search history.

(56) References Cited

U.S. PATENT DOCUMENTS

| 5,543,875 A | * | 8/1996 | Machida | ................ G03B 15/05 396/85 |
| 8,467,579 B2 | | 6/2013 | Cho et al. | |

(Continued)

FOREIGN PATENT DOCUMENTS

| JP | 2002-216167 A | 8/2002 |
| JP | 2015-33047 A | 2/2015 |

(Continued)

OTHER PUBLICATIONS

Office Action issued on Feb. 29, 2024 by the Korean Intellectual Property Office in Korean Patent Application No. 10-2020-0051815.

(Continued)

*Primary Examiner* — Stefan Gadomski
(74) *Attorney, Agent, or Firm* — Sughrue Mion, PLLC

(57) ABSTRACT

A device and method of obtaining a depth of a space are provided. The method includes obtaining a plurality of images by photographing a periphery of a camera a plurality of times while sequentially rotating the camera by a preset angle, identifying a first feature region in a first image and an n-th feature region in an n-th image, the n-th feature region being identical with the first feature region, by comparing adjacent images between the first image and the n-th image from among the plurality of images, obtaining a base line value with respect to the first image and the n-th image, obtaining a disparity value between the first feature region and the n-th feature region, and determining a depth of the first feature region or the n-th feature region based on at least the base line value and the disparity value.

16 Claims, 18 Drawing Sheets

(51) Int. Cl.
  *H04N 13/296* (2018.01)
  *H04N 23/61* (2023.01)
  *H04N 23/667* (2023.01)
  *H04N 23/695* (2023.01)
(52) U.S. Cl.
  CPC ......... *H04N 23/667* (2023.01); *H04N 23/695* (2023.01); *H04N 2013/0081* (2013.01)

(56) References Cited

U.S. PATENT DOCUMENTS

| | | | |
|---|---|---|---|
| 9,197,879 | B2 | 11/2015 | Lin et al. |
| 9,485,495 | B2 | 11/2016 | Atanassov et al. |
| 9,641,754 | B2 | 5/2017 | Oh |
| 9,843,722 | B2 | 12/2017 | Park et al. |
| 9,930,312 | B2 | 3/2018 | Kim et al. |
| 9,959,634 | B2 | 5/2018 | Brueckner et al. |
| 9,973,694 | B1* | 5/2018 | van Hoff ............... H04N 13/271 |
| 9,973,696 | B1* | 5/2018 | Meler ........................ G06T 3/14 |
| 10,091,409 | B2 | 10/2018 | Govindarao et al. |
| 10,904,512 | B2 | 1/2021 | Yerushalmy et al. |
| 10,936,089 | B2* | 3/2021 | Thomas, III ........... G06F 3/0317 |
| 11,080,590 | B2* | 8/2021 | Smolyanskiy .......... G06T 7/593 |
| 11,195,259 | B2* | 12/2021 | Li ............................. G06T 3/18 |
| 11,233,961 | B2 | 1/2022 | Kang et al. |
| 11,257,272 | B2* | 2/2022 | Rowell ................. G06T 1/0014 |
| 12,148,229 | B2* | 11/2024 | Raz ....................... A61B 5/0205 |
| 2013/0328769 | A1* | 12/2013 | Jung ........................ G06F 3/017 345/156 |
| 2013/0329015 | A1* | 12/2013 | Pulli ....................... G06T 7/593 348/47 |
| 2014/0101578 | A1* | 4/2014 | Kwak ..................... G06F 3/017 715/761 |
| 2014/0292648 | A1* | 10/2014 | Matsuda ............. G06F 3/04883 345/156 |
| 2014/0362192 | A1* | 12/2014 | Lin ...................... H04N 13/221 348/50 |
| 2015/0054913 | A1* | 2/2015 | Annau ............... G06Q 30/0246 348/36 |
| 2015/0062293 | A1 | 3/2015 | Cho et al. |
| 2015/0271402 | A1* | 9/2015 | Guo ..................... H04N 23/631 348/39 |
| 2016/0148433 | A1 | 5/2016 | Petrovskaya et al. |
| 2017/0347022 | A1* | 11/2017 | Pettersson ............ H04N 23/698 |
| 2018/0025505 | A1 | 1/2018 | Huang et al. |
| 2018/0139431 | A1* | 5/2018 | Simek .................. H04N 13/271 |
| 2018/0314867 | A1* | 11/2018 | Kotula ................. G06K 7/1413 |
| 2019/0058811 | A1* | 2/2019 | Douady-Pleven ........ G06T 5/77 |
| 2020/0205942 | A1* | 7/2020 | Pesach ................. G06V 20/653 |
| 2020/0286248 | A1* | 9/2020 | Shi ...................... G06F 18/2431 |
| 2020/0372265 | A1* | 11/2020 | Ko .......................... G06V 10/82 |
| 2021/0127051 | A1* | 4/2021 | Lai ....................... H04N 23/741 |
| 2021/0158493 | A1* | 5/2021 | Slutsky ................. G06T 3/4038 |

FOREIGN PATENT DOCUMENTS

| | | | |
|---|---|---|---|
| JP | 2020-018713 | * | 2/2020 |
| KR | 10-2009-0072523 A | | 7/2009 |
| KR | 10-2012-0108747 A | | 10/2012 |
| KR | 20140085048 A | * | 7/2014 |
| KR | 10-2015-0026201 A | | 3/2015 |
| KR | 10-2018-0108106 A | | 10/2018 |
| KR | 10-2020-0097865 A | | 8/2020 |

OTHER PUBLICATIONS

International Searching Report (PCT/ISA/220, PCT/ISA/210) issued Aug. 9, 2021 by the International Searching Authority in International Patent Application No. PCT/KR2021/005307.

Written Opinion (PCT/ISA/237) issued Aug. 9, 2021 by the International Searching Authority in International Patent Application No. PCT/KR2021/005307.

Notice Of Allowance issued Nov. 28, 2024 by the Korean Patent Office for KR Patent Application No. 10-2020-0051815.

\* cited by examiner

DEVICE AND METHOD FOR ACQUIRING DEPTH OF SPACE BY USING CAMERA

CROSS-REFERENCE TO RELATED APPLICATIONS

This application is a by-pass continuation application of International Application No. PCT/KR2021/005307, filed on Apr. 27, 2021, which based on and claims priority to Korean Patent Application No. 10-2020-0051815, filed on Apr. 28, 2020, in the Korean Intellectual Property Office, the disclosures of which are incorporated by reference herein in their entireties.

BACKGROUND

1. Field

The disclosure relates to a device for and method of obtaining a depth of a space by using a camera, and in particular, to a device for and method of calculating a depth value of a peripheral space by using a rotating camera.

2. Description of Related Art

Augmented reality is a technology of projecting a virtual image onto a physical environmental space or a real world object and showing them as one image.

An augmented reality device is worn on the face or head of a user, and allows the user to see a real world scene along with a virtual image through a display module of a see-through type, which is arranged in front of the eyes of the user. As research on augmented reality devices has been actively carried out, various types of wearable devices have been released or are to be released. For example, such wearable display devices may include wearable glasses or head mounted displays.

Such an augmented reality device needs to measure a depth of an actual object in order to recognize a gesture of the user or to naturally display a virtual object along with the actual object. An augmented reality device according to the related art measures a depth of a peripheral space by using a plurality of cameras or a time-of-flight (TOF) camera in order to recognize objects in the peripheral space, and accordingly, the weight of the camera or the number of cameras may increase. Also, a volume, a weight, and a battery consumption amount of the augmented reality device may also increase.

Accordingly, it is desirable to reduce the weight and size of the augmented reality device so that a user does not feel uncomfortable even when the user wears the augmented reality device for a long period of time or frequently.

According to an embodiment of the present disclosure, provided are a device and method of effectively calculating a depth of a certain region while reducing a weight of the device, by comparing images that are obtained through capturing images of a periphery of a camera a plurality of times while sequentially rotating one camera module by a preset angle.

Also, according to an embodiment of the present disclosure, provided are a device and method of effectively recognizing the same certain region in images by comprising the images adjacent to each other from among a plurality of images captured sequentially, and calculating depth values of the certain regions based on identified locations of the certain regions.

Also, according to an embodiment of the present disclosure, provided are a device and method of setting a photographing angle range through a camera module according to a photographing mode.

SUMMARY

According to an aspect of the disclosure, a method, performed by a device, of obtaining a depth of a feature region, includes: obtaining a plurality of images by photographing an external environment of a camera of the device a plurality of times while sequentially rotating the camera by a preset angle; identifying a first feature region in a first image and an n-th feature region in an n-th image by comparing adjacent images between the first image and the n-th image from among the plurality of images, the n-th feature region being identical to the first feature region; obtaining a base line value with respect to the first image and the n-th image, based on a first arrangement of the camera when the first image is captured and a second arrangement of the camera when the n-th image is captured; obtaining a disparity value between the first feature region and the n-th feature region, based on a position of the first feature region in the first image and a position of the n-th feature region in the n-th image; and determining a depth of the first feature region or the n-th feature region, based on at least the base line value and the disparity value.

The obtaining the plurality of images may include sequentially photographing the external environment of the camera while panning the camera at certain angle intervals within a certain photographing angle range.

The identifying of the first feature region and the n-th feature region may further include identifying feature regions that are identical with the first feature region, from among the feature regions in the first image to the n-th image, by sequentially comparing adjacent images with each other from among the first image to the n-th image of the plurality of images.

The method of claim 1, wherein a photographing angle of the camera is changed when the camera sequentially rotates by the preset angle, and the base line value with respect to the first image and the n-th image is determined based on a distance value between a location of a camera lens of the camera when the first image is captured and a location of the camera lens of the camera when the n-th image is captured.

The obtaining the disparity value may further include: virtually arranging the camera when the first image is captured and the camera when the n-th image is captured such that a first photographing direction of the camera when the first image is captured and a second photographing direction of the camera when the n-th image is captured are parallel to each other; arranging the first image and the n-th image based on the first photographing direction of the camera and the second photographing direction of the camera; and obtaining a distance value between the first feature region in the arranged first image and the arranged n-th feature region in the n-th image.

The arranging the camera may include virtually arranging the camera when the first image is captured and the camera when the n-th image is captured while maintaining the base line value with respect to the first image and the n-th image.

The determining the depth may include determining the depth based on the base line value, the disparity value, and focal lengths of the camera when the first image and the n-th image are captured.

The method may further include: determining a photographing mode of the camera; and identifying a photographing angle range set according to the photographing mode, and the obtaining the plurality of images may include obtaining the plurality of images while sequentially rotating the camera by the preset angle within the identified photographing angle range.

The photographing mode may include at least one of a gesture recognition mode for identifying a gesture of a user around the camera and a space recognition mode for recognizing a space around the camera.

The obtaining the plurality of images may further include determining a focal length of the camera, and the determining the depth of the first feature region or the n-th feature region may include determining the depth of the first feature region or the n-th feature region based on the base line value, the disparity value, and the focal length of the camera.

According to an aspect of the disclosure, a device includes: a camera; a photographing direction controller configured to rotate the camera; a display; a memory storing one or more instructions; and a processor configured to execute the one or more instructions to: obtain a plurality of images by controlling the photographing direction controller and the camera to photograph an external environment of the camera a plurality of times while sequentially rotating the camera by a preset angle, identify a first feature region in a first image and an n-th feature region in an n-th image by comparing adjacent images between the first image and the n-th image from among the plurality of images, the n-th feature region being identical to the first feature region, obtain a base line value with respect to the first image and the n-th image, based on a first arrangement of the camera when the first image is captured and a second arrangement of the camera when the n-th image is captured, obtain a disparity value between the first feature region and the n-th feature region based on a position of the first feature region in the first image and a position of the n-th feature region in the n-th image, and determine a depth of the first feature region or the n-th feature region at least based on at least the base line value and the disparity value.

The processor may be further configured to execute the one or more instructions to sequentially photograph the external environment of the camera while panning the camera at certain angle intervals within a certain photographing angle range.

The processor may be further configured to execute the one or more instructions to identify feature regions that are identical with the first feature region, from among the feature regions in the first image to the n-th image, by sequentially comparing adjacent images with each other from among the first image to the n-th image of the plurality of images.

A photographing angle of the camera is changed when the camera sequentially rotates by the preset angle, and the base line value with respect to the first image and the n-th image is determined based on a distance value between a first location of a camera lens of the camera when the first image is captured and a second location of the camera lens of the camera when the n-th image is captured.

The processor may be further configured to execute the one or more instructions to: determine a focal length of the camera, and determine the depth of the first feature region or the n-th feature region based on the base line value, the disparity value, and the focal length of the camera.

According to an aspect of the disclosure, a non-transitory computer-readable recording medium having recorded thereon a program, which when executed by a computer, performs the method of obtaining a depth of a feature region.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
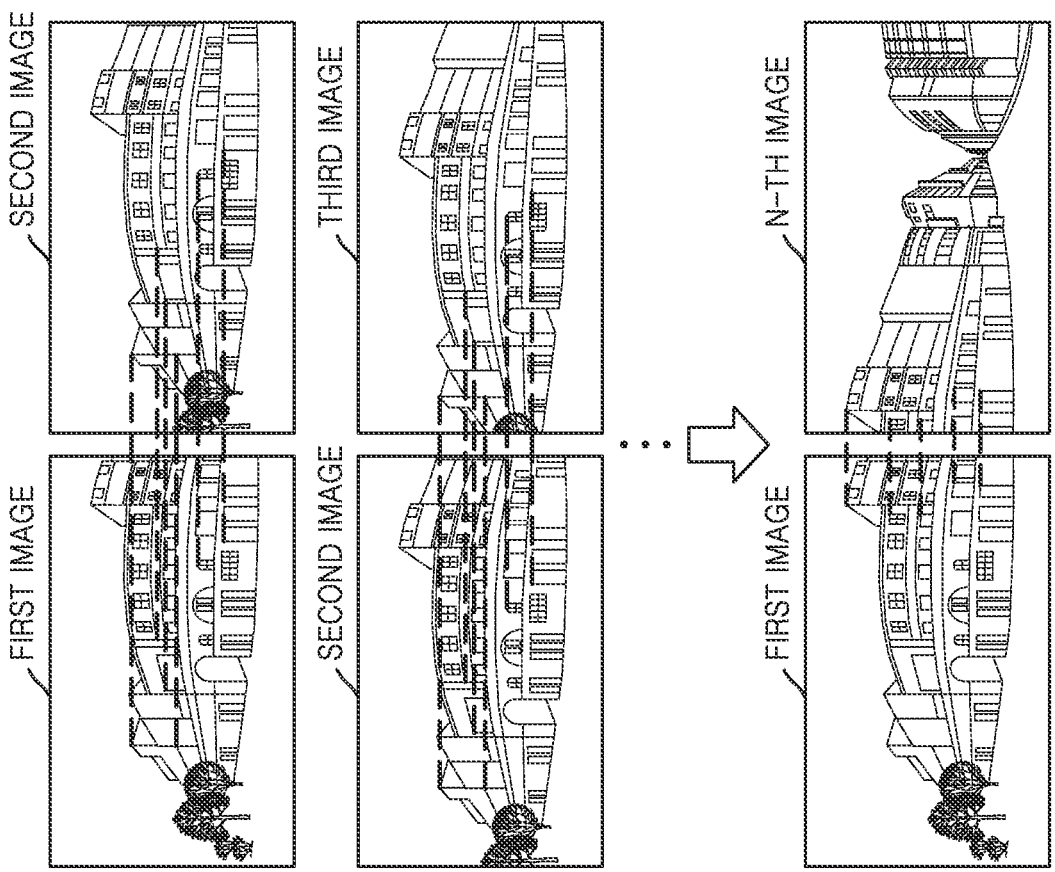
FIG. 1 is a schematic diagram illustrating a method of obtaining a depth of a peripheral area by using a device according to an embodiment of the present disclosure.
Figure 1:
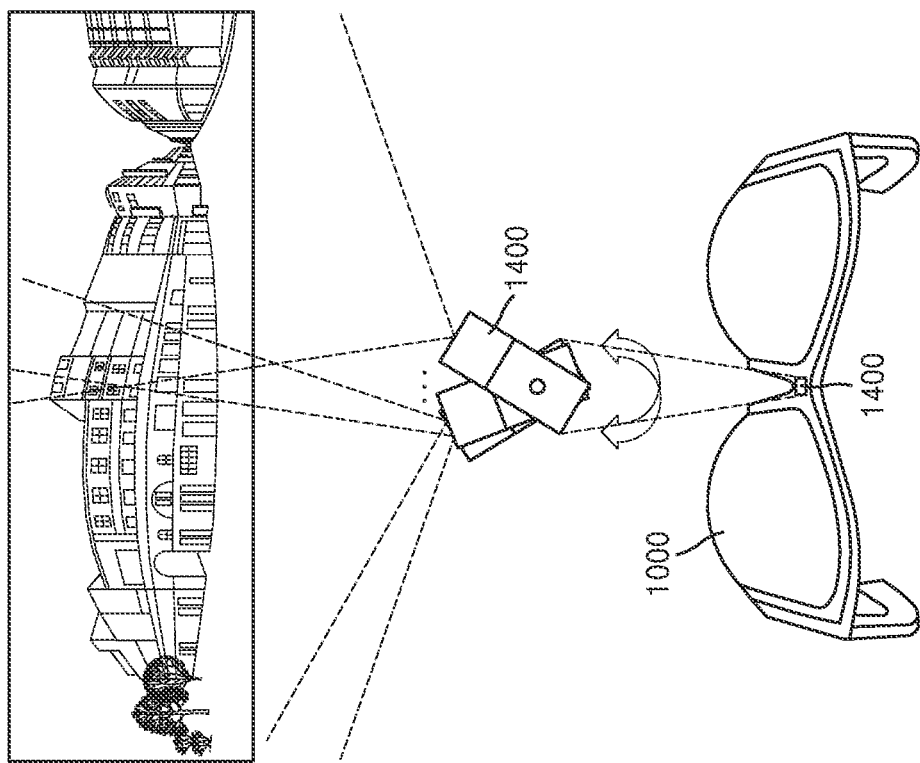

Hereinafter, various embodiments of the disclosure will be described in detail with reference to accompanying drawings to the extent that one of ordinary skill in the art would be able to carry out the disclosure. However, the disclosure may be implemented in various manners, and is not limited to one or more embodiments of the disclosure described herein. In addition, components irrelevant with the description are omitted in the drawings for clear description, and like reference numerals are used for similar components throughout the entire specification.

Throughout the specification, it will be understood that when an element is referred to as being "connected" to another element, it may be "directly connected" to the other element or "electrically connected" to the other element with intervening elements therebetween. It will be further understood that when a portion is referred to as "comprises" or "includes" another component, the portion may not exclude another component but may further comprise or include another component unless the context states otherwise.

In the present disclosure, 'augmented reality (AR)' used herein is a technology that overlays a virtual image on a physical environment space of the real world or a real world object and a virtual image along with each other.

In addition, 'AR device' denotes a device capable of displaying AR, and may include a head mounted display (HMD) apparatus or an AR helmet worn on the head portion, as well as AR glasses resembling eyeglasses worn on the face of the user.

In addition, 'real scene' used herein refers to a scene of the real world seen by the user through an AR device and may include real world objects. Also, 'virtual image' refers to an image generated by an optical engine and may include both a static image and a dynamic image. The virtual image may be observed with the real scene, and may be an image showing information about a real world object in the real scene, information about an operation of an AR device, a control menu, etc.

Therefore, a general AR device includes an optical engine for generating a virtual image from the light generated by a light source, and a wave guide that guides the virtual image generated by the optical engine to eyes of the user and is formed of a transparent material such that the user may see the real scene as well. As described above, because the AR device has to allow the user to observe the scene from the real world, an optical element for changing an optical path of the light that basically has straight property is necessary for guiding the light generated by the optical engine to the eyes of the user via the wave guide. Here, the optical path may be changed by using reflection by a mirror, etc., or may be changed through diffraction due to a diffraction element such as a diffractive optical element (DOE), a holographic optical element (HOE), etc., but is not limited thereto.

Also, in the present disclosure, a gesture recognition mode refers to a photographing mode for photographing a gesture made by the body of the user who is located at a near distance within a photographing angle range that is less than a certain critical value, and a space recognition mode may refer to a photographing mode for photographing a peripheral space of a device 1000 within a photographing angle range that is greater than the certain critical value.

Also, in the present disclosure, a disparity value with respect to two images may denote a value indicating how much a certain region in one image is shifted in another image between two captured images.

Also, in the present disclosure, a base line value may refer to a value indicating a distance between a photographing center of a camera module when one image is captured and a photographing center of the camera module when another image is captured. The photographing center of the camera module may refer to, for example, a central point of a lens in the camera module.

The embodiments will be described in detail below with reference to accompanying drawings.

FIG. 1 is a schematic diagram illustrating a method of obtaining a depth of a peripheral region by a device according to an embodiment of the present disclosure.

Referring to FIG. 1, the device 1000 may sequentially photograph a periphery (an external environment) of the device 1000 by using a camera module (a camera) 1400 while rotating the camera module 1400 by a preset angle, and may obtain a plurality of images of the periphery of the device 1000. The device 1000 obtains the plurality of images including a first image to an n-th image, and compares two adjacent images from among the plurality of images to identify identical feature regions in the plurality of images. Also, as such, the device 1000 may obtain a disparity value between the identical feature regions in the first image and the n-th image, and may calculate a depth value with respect to the feature region.

The device 1000 may refer to an augmented reality (AR) device that may represent the AR. The device 1000 may include, for example, AR glasses resembling eyeglasses worn on the face of a user, a head mounted display (HMD) apparatus or an AR helmet worn on the head portion.

Also, the device 1000 may refer to a smartphone, a tablet personal computer (PC), a PC, a smart television (TV), a mobile phone, a personal digital assistant (PDA), a laptop, a media player, a micro-server, a global positioning system (GPS), an E-book terminal, a digital broadcasting terminal, a navigation system, a kiosk, an MP3 player, a digital camera, an electronic appliance, and other mobile or non-mobile computing device. However, the device 1000 is not limited thereto, that is, the device 100 may include all kinds of devices that may process images obtained by controlling a camera module.

Figure 2:
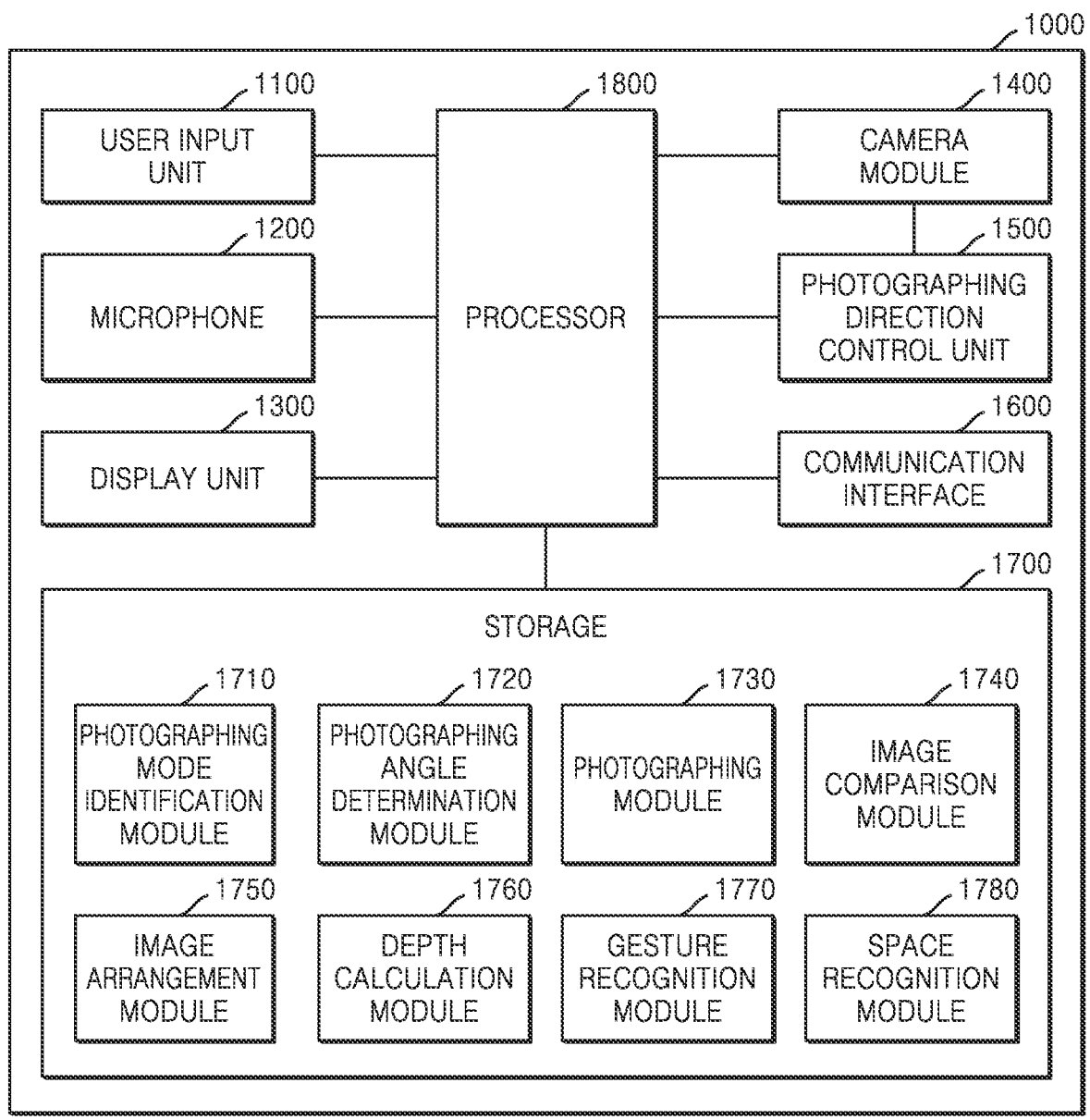
FIG. 2 is a block diagram of a device according to an embodiment of the present disclosure.

FIG. 2 is a block diagram of a device according to an embodiment of the present disclosure.

Referring to FIG. 2, the device 1000 according to an embodiment of the present disclosure may include a user input unit 1100, a microphone 1200, a display unit (display) 1300, a camera module (camera) 1400, a photographing direction control unit (photographing direction controller) 1500, a communication interface 1600, a storage 1700, and a processor 1800.

The user input unit 1100 denotes a unit to which data for controlling the device 1000 is input by the user. For example, the user input unit 1100 may include, but is not limited to, at least one from a keypad, a dome switch, a touch pad (a capacitive overlay type, a resistive overlay type, an infrared beam type, a surface acoustic wave type, an integral strain gauge type, a piezoelectric type, etc.), a jog wheel, and a jog switch.

The user input unit 1100 may photograph the periphery of the device 1000 by using the camera module 1400 that will be described later, and may receive a user input for receiving service from the device 1000 or a server based on the captured images.

The microphone 1200 receives a sound signal from outside and processes the sound signal as electrical voice data. For example, the microphone 1200 may receive a sound signal from an external device or a narrator. The microphone 1200 may use various noise cancelling algorithms for cancelling noise generated when receiving the sound signal from the outside. The microphone 1200 may receive a voice input from the user for controlling the device 1000.

The display unit 1300 outputs information processed in the device 1000. For example, the display unit 1300 may display a user interface for photographing the periphery of the device 1000, and information regarding the service provided on the basis of the captured images of the periphery of the device 1000. According to the device 1000 of an embodiment, the display 1300 may provide an AR image. The display 1300 according to an embodiment may include a wave guide and a display module. The wave guide may be formed of a transparent material so that a part of a rear surface may be seen when the user wears the device 1000. The wave guide may include a transparent flat plate having a single or multi-layered structure in which the light may propagate while being reflected. The wave guide may receive the light of a virtual image that is projected to face an exit surface of a display module. Here, the transparent material denotes a material through which the light may pass, and transparency may not be 100% and may have a certain color. In an embodiment, the wave guide is formed of a transparent material, and thus, the user may not only see a virtual object in a virtual image through the display 1300, but also sees a real scene outside. Thus, the wave guide may be referred to as a see-through display. The display 1300 may provide the AR image by outputting the virtual object of the virtual image through the wave guide.

The camera module 1400 may photograph the periphery of the device 1000. The camera module may obtain image frames of a still image or a moving picture through an image sensor when an application requiring a photographing function is executed. An image captured by the image sensor may be processed by the processor 1800 that will be described later or an additional image processor.

The photographing direction control unit 1500 may change a photographing direction of the camera module 1400. The photographing direction controller 1500 may include a hardware structure that may change the photographing direction of the camera module 1400 by panning the camera module 1400. The camera module 1400 may be rotated in a clockwise direction or a counter-clockwise direction about a certain axis by the photographing direction controller 1500 and may sequentially capture images of the periphery of the device 1000 while rotating by a certain angle. The photographing direction controller 1500 may include, for example, an electromagnet located around the camera module 1400, and may control the photographing direction of the camera module 1400 by using a magnetic force that is generated when an electricity is applied to the electromagnet. Alternatively, the photographing direction controller 1500 may include, for example, a motor physically connected to the camera module 1400, and may control the photographing direction of the camera module 1400 by using the motor. However, the method for the photographing direction controller 1500 to control the photographing direction of the camera module 1400 is not limited thereto, and the photographing direction of the camera module 1400 may be controlled by rotating the camera module 1400 by various methods.

The communication interface 1600 may transmit/receive to/from an external device and a server data for receiving service based on the images obtained by photographing the periphery of the device 1000.

The storage 1700 may store programs that are to be executed by the processor 1800 that will be described later and data input to/output from the device 1000.

The storage 1700 may include a storage medium of at least one type of a flash memory type, a hard disk type, a multimedia card micro type, a card type memory (e.g., an SD or XD memory, etc.), random access memory (RAM), static RAM (SRAM), read-only memory (ROM), electrically erasable programmable ROM (EEPROM), programmable (PROM), a magnetic memory, a magnetic disk, or an optical disk.

Programs stored in the storage 1700 may be classified as a plurality of modules according to functions thereof, for example, may include a photographing mode identification module 1710, a photographing angle determination module 1720, a photographing module 1730, an image comparison module 1740, an image arrangement module 1750, a depth calculation module 1760, a gesture recognition module 1770, and a space recognition module 1780.

The processor 1800 controls overall operations of the device 1000. For example, the processor 1800 may overall control the user input unit 1100, the microphone 1200, the display 1300, the camera module 1400, the photographing direction controller 1500, the communication interface 1600, the storage 1700, etc. by executing the programs stored in the storage 1700.

The processor 1800 may identify the photographing mode of the camera module 1400 by executing the photographing mode identification module 1710 stored in the storage 1700. The photographing mode of the camera module 1400 may include, for example, a gesture recognition mode for recognizing a gesture of the user and a space recognition mode for recognizing a space around the device 1000. The gesture recognition mode refers to a photographing mode for photographing a gesture made by the body of the user who is located at a near distance within a photographing angle range that is less than a certain critical value, and the space recognition mode may refer to a photographing mode for photographing a peripheral space of the device 1000 within a photographing angle range that is greater than the certain critical value.

The processor 1800 may identify the photographing mode of the camera module 1400 according to a preset criterion. For example, when the device 1000 is turned on or the device 1000 is activated from an inactivated state, the processor 1800 may identify the photographing mode of the camera module 1400 as the gesture recognition mode for receiving a gesture input of the user. Also, the processor 1800 may recognize the gesture of the user in the gesture recognition mode and may change the photographing mode of the camera module 1400 according to the recognized gesture. The processor 1800 may execute an application corresponding to the gesture and may change the photographing mode of the camera module 1400 according to the photographing mode required by the application that is being executed. Also, for example, the processor 1800 may inactivate the camera module 1400 when an application that does not require the photographing operation through the camera module 1400 is executed.

Alternatively, for example, when the device 1000 is turned on or the device 1000 is activated from the inactivated state, the device 1000 may identify the photographing mode of the camera module 1400 as the space recognition mode. Also, the processor 1800 may recognize the peripheral space of the device 1000 by photographing the periphery of the device 1000 in the space recognition mode.

Also, for example, when the processor 1800 receives a preset user input for the device 1000, the processor 1800 may identify the photographing mode of the camera module 1400 as the gesture recognition mode or the space recognition mode.

The processor 1800 may determine a range of the photographing angle of the camera module 1400 by executing the photographing angle determination module 1720 stored in the storage 1700. The processor 1800 may determine the photographing angle range according to the identified photographing mode. In this case, the photographing angle range according to the photographing mode may be set in advance.

For example, when the photographing mode of the camera module 1400 is the gesture recognition mode, the camera module 1400 may be set to photograph the periphery of the device 1000 within a photographing angle range of −15° to 15°. For example, when it is assumed that an angle while the camera module 400 faces the front is 0°, the camera module 1400 may rotate by an angle of −15° to the left and by an angle of 15° to the right on the basis of the front surface, in the case in which the photographing angle range of the camera module 1400 is −15° to 15°.

For example, when the photographing mode of the camera module 1400 is the space recognition mode, the camera module 1400 may be set to photograph the periphery of the device 1000 within a photographing angle range of −60° to 60°. For example, when it is assumed that an angle while the camera module 400 faces the front is 0°, the camera module 1400 may rotate by an angle of −60° to the left and by an angle 60° of to the right on the basis of the front surface in the case in which the photographing angle range of the camera module 1400 is −60° to 60°.

The processor 1800 may determine a photographing interval of the camera module 1400 by executing the photographing angle determination module 1720 stored in the storage 1700. The processor 1800 may determine angle intervals of photographing the periphery of the device 1000 within the photographing angle range. For example, the processor 1800 may determine the photographing interval so that the periphery of the device 1000 is photographed at a 5° interval within the photographing angle range. Also, the photographing interval of the camera module 1400 may be set differently according to, for example, the photographing mode and a photographing environment. The photographing environment may include brightness around the device 1000, the number of objects, movement of the object, etc., but is not limited thereto.

The processor 1800 may photograph the periphery of the device 1000 via the camera module 1400 by executing the photographing module 1730 stored in the storage 1700. The processor 1800 may obtain a plurality of images by sequentially photographing the periphery of the device 1000 according to the determined photographing interval within the recognized photographing angle range, by controlling the camera module 1400 and the photographing direction controller 1500. The camera module 1400 may photograph the periphery of the device 1000 a plurality of times according to the photographing interval while rotating within the photographing angle range. From among the images captured by the camera module 1400, adjacent images may partially overlap each other.

Alternatively, the processor 1800 may photograph a video while rotating the camera module 1400 within the photographing angle range, by controlling the camera module 1400 and the photographing direction controller 1500. In this case, the processor 1800 may extract a plurality of frames according to the photographing interval, from among frames in the captured video. From among images of the extracted frames, adjacent images may partially overlap each other.

The processor 1800 may change a focal length of the camera module 1400 by executing the photographing module 1730 stored in the storage 1700. When the camera module 1400 photographs objects located within a distance less than a certain critical value, the processor 1800 may not change the focal length of the camera module 1400. When the camera module 1400 is activated, the focal length of the camera module 1400 may be set to measure an object located at a close distance, and as such, the processor 1800 may not change the focal length of the camera module 1400 so as to photograph the object at the close distance. Also, focal lengths for photographing the objects at close distances around a certain distance value are substantially equal to one another, and thus, the processor 1800 may not change the focal length of the camera module 1400. Also, when the camera module 1400 photographs objects that are located at farther distances than a certain critical value, the processor 1800 may control the camera module 1400 so that the camera module 1400 photographs the periphery of the device 1000 according to the changed focal length while changing the focal length according to the objects.

The processor 1800 may compare the adjacent images from among the plurality of images obtained through the camera module 1400, by executing the image comparison module 1740 stored in the storage 1700. The processor 1800 may identify identical feature regions in adjacent images by comparing the adjacent images with each other.

For example, when five images are obtained by the camera module 1400, the processor 1800 compares a first image with a second image, the second image with a third image, the third image with a fourth image, and the fourth image with a fifth image. Also, the processor 1800 may identify that a first feature region in the first image is identical with a second feature region in the second image, the second feature region in the second image is identical with a third feature region in the third image, the third feature region in the third image is identical with a fourth feature region in the fourth image, and the fourth feature region in the fourth image is identical with a fifth feature region in the fifth image. Accordingly, the processor 1800 may efficiently identify that the first feature region in the first image is identical with the fifth feature region in the fifth image. Also, for example, the feature region in an image may include a certain feature point.

The processor 1800 may arrange two images that are selected from the plurality of images, by executing the image arrangement module 1750 stored in the storage 1700. The processor 1800 may select two images having photographing angle difference that is equal to or greater than a certain critical value, in order to calculate a depth of the feature region. For example, the processor 1800 may select two images, from among the plurality of images, having the largest difference between the photographing angles thereof and including the same feature region, and thus, the depth of the feature region may be more precisely calculated. For example, when five images are obtained by the camera module 1400, the processor 1800 may select the first image and the fifth image which are different from each other by a certain degree or greater, from among five images.

Also, the processor 1800 may virtually arrange the two images in order to obtain a disparity value with respect to the selected two images. The disparity value with respect to two images may denote a value indicating how much a certain region in one image is shifted in another image between two captured images.

The processor 1800 may virtually arrange the camera module 1400 so that the photographing directions of the camera module 1400 may be parallel to each other. For example, the camera module 1400 capturing the first image and the camera module 1400 capturing the fifth image may be virtually arranged so that the photographing direction of the camera module 1400 capturing the first image and the photographing direction of the camera module 1400 capturing the fifth image may be parallel to each other while maintaining a base line value between the camera module 1400 capturing the first image and the camera module 1400 capturing the fifth image. The base line value may refer to a value indicating a distance between a photographing center of the camera module 1400 when one image is captured and a photographing center of the camera module 1400 when another image is captured. The photographing center of the camera module 1400 may refer to, for example, a central point of a lens in the camera module 1400. The method of virtually arranging the camera module 1400 will be described later.

The processor 1800 may arrange the images on the basis of the position of the camera module 1400 that is virtually arranged. For example, the first image and the fifth image may be virtually arranged on the basis of the position of arranging the camera module 1400 when the first image is captured and the position of arranging the camera module 1400 when the fifth image is captured. In this case, the processor 1800 may obtain the disparity value between a first feature region in the first image and a fifth feature region in the fifth image, based on the location of the first feature region in the first image that is virtually arranged and the location of the fifth feature region in the fifth image that is virtually arranged. For example, the disparity value may be calculated based on the distance between the identical feature regions in the images that are virtually arranged.

The processor 1800 may calculate a depth of the feature region by executing the depth calculation module 1760 stored in the storage 1700. The processor 1800 may calculate the depth of the identical feature regions in the two images by using the disparity value with respect to the identical feature regions in the two images, the base line value of the camera module 1400, and the focal length of the camera module 1400. The processor 1800 may calculate the depth of the feature region by using the factor that a ratio between the base line value and the focal length is equal to a ratio between the disparity value and the depth.

The processor 1800 may generate a depth map of the peripheral space of the device 1000, by calculating the depths of the feature regions in the image. The depth map refers to an image representing three-dimensional distance information among the objects or spaces existing in the image, and each pixel value in the image may indicate depth information of a corresponding pixel. The depth information may include a value indicating a distance from a view point to a space corresponding to a certain pixel. The depth map may represent a portion far from the view point and a portion close to the view point to be distinguished from each other.

For example, in the depth map, a part from a point far from the view point of the user to a point close to the view point may be represented in a gradient manner to be darkened from white to black. Accordingly, shapes and depths of the objects in the peripheral space of the device 1000 may be expressed to be distinguished in the depth map.

The processor 1800 may generate a plurality of depth maps about some parts of the peripheral space of the device 1000 from certain units of image sets, and connect the generated plurality of depth maps to complete the depth map about the peripheral space of the device 1000. For example, when the camera module 1400 obtains 20 images by photographing the periphery of the device 1000 while rotating, the processor 1800 may generate a first partial depth map from a first image set including first to tenth images, a second partial depth map from a second image set including sixth to fifteenth images, and a third partial depth map from a third image set including eleventh to twentieth images. Also, the processor 1800 may generate an entire depth map by using the first, second, and third partial depth maps.

In addition, the processor 1800 may recognize the depth of the feature region by using an artificial intelligence (AI) model. In this case, the processor 1800 may obtain information about the depth of the feature region by inputting the images captured by the camera module 1400 into the AI model that is trained to calculate the depth of the feature region from the images. The depth information of the feature region obtained from the AI model may be used to verify the depth information calculated by the depth calculation module 1760, but is not limited thereto. Also, the images captured by the camera module 1400 and the depth information calculated by the depth calculation module 1760 may be used to update the AI model for calculating the depth.

In addition, the processor 1800 may obtain the depth map by using the AI model. In this case, the processor 1800 may obtain the depth map of the peripheral space of the device 1000 by inputting the images captured by the camera module 1400 into the AI model that is trained to generate the depth map from the images. The depth map obtained from the AI model may be used to verify the depth map generated by the depth calculation module 1760, but is not limited thereto. Also, the images captured by the camera module 1400 and the depth map generated by the depth calculation module 1760 may be used to update the AI model for generating the depth map.

The processor 1800 may recognize the gesture of the user by executing the gesture recognition module 1770 stored in the storage 1700. The processor 1800 may obtain images while repeatedly rotating a plurality of times within the photographing angle range. For example, the processor 1800 may obtain a first gesture image set while rotating first within the photographing angle range, may obtain n second gesture image sets while rotating second time within the photographing angle range, and obtain n third gesture image sets while rotating third time within the photographing angle range. Also, for example, the processor 1800 may recognize a first shape and a first position of the user's hand by calculating a depth of the user's hand from the images in the first gesture image set. For example, the processor 1800 may recognize a second shape and a second position of the user's hand by calculating the depth of the user's hand from the images in the second gesture image set. For example, the processor 1800 may recognize a third shape and a third position of the user's hand by calculating the depth of the user's hand from the images in the third gesture image set. Also, the processor 1800 may recognize a change in the shape of the user's hand based on the first shape, the second shape, and the third shape of the user's hand, and recognize the gesture according to the change in the shape of the user's hand. Also, the processor 1800 may identify the change in the hand's position on the basis of the first to third positions of the user's hand, and may recognize the gesture according to the identified change of the hand's position. The processor 1800 may recognize the gesture in consideration of the changes in both the shape and position of the user's hand. In the above description, the gesture according to the user's hand is described, but other body parts than the user's hand may be recognized for recognizing the gesture.

The processor 1800 may identify the gesture by using the AI model. In this case, the processor 1800 may identify the gesture of the user by inputting images captured by the camera module 1400 into the AI model that is trained to identify the gesture of the user from the images. The gesture identified by the AI model may be used to verify the gesture recognized by the gesture recognition model, but is not limited thereto. Also, the images captured by the camera module 1400 and the gesture recognized by the gesture recognition module 1770 may be used to update the AI model for recognizing the gesture.

The processor 1800 may recognize the peripheral space of the device 1000 by executing the space recognition module 1780 stored in the storage 1700. The processor 1800 may identify what the feature regions are around the device 1000 from the depth map generated with respect to the periphery of the device 1000. For example, the processor 1800 may generate identification information about what is the object corresponding to the feature region around the device 1000, coordinate information representing relative location of the feature region with respect to the device 1000, depth information representing the distance between the device 1000 and the feature region, etc.

Also, the processor 1800 may identify a space that is not recognized in the peripheral space of the device 1000, and when the space that is not recognized is photographed, the processor 1800 generates a depth map about the non-recognized space and add the depth map to the entire depth map. In this case, the processor 1800 may store history about which region around the device 1000 has been photographed by the camera module 1400, and may activate the space recognition mode when the camera module 1400 faces a space that is not photographed based on the stored history.

The processor 1800 may recognize the space by using an AI model. In this case, the processor 1800 may recognize the peripheral space of the device 1000 by inputting the images captured by the camera module 1400 or the depth map into the AI model that is trained to recognize the feature region in the space from the images. The space information recognized by the AI model may be used to detect the space recognized by the space recognition module, but is not limited thereto. Also, the images captured by the camera module 1400 or depth map, and the space information recognized by the space recognition module 1780 may be used to update the AI model for recognizing the space.

Figure 3:
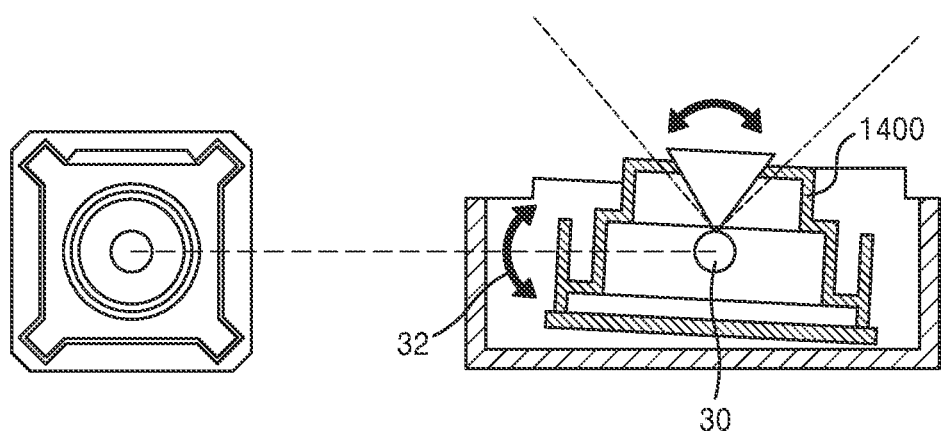
FIG. 3 is a diagram showing an example in which a camera module in a device is rotating, according to an embodiment of the present disclosure.

FIG. 3 is a diagram showing an example in which a camera module in a device according to an embodiment of the present disclosure is rotating.

Referring to FIG. 3, the photographing direction controller 1500 may rotate the camera module 1400 in the clockwise direction or the counter-clockwise direction (32) around the rotating center 30. Accordingly, the camera module 1400 may sequentially photograph the periphery of the device 1000 while rotating by a certain angle. Also, the camera module 1400 may photograph the periphery of the device 1000 while panning or tilting about the rotating center 30 by a certain angle.

Figure 4A:
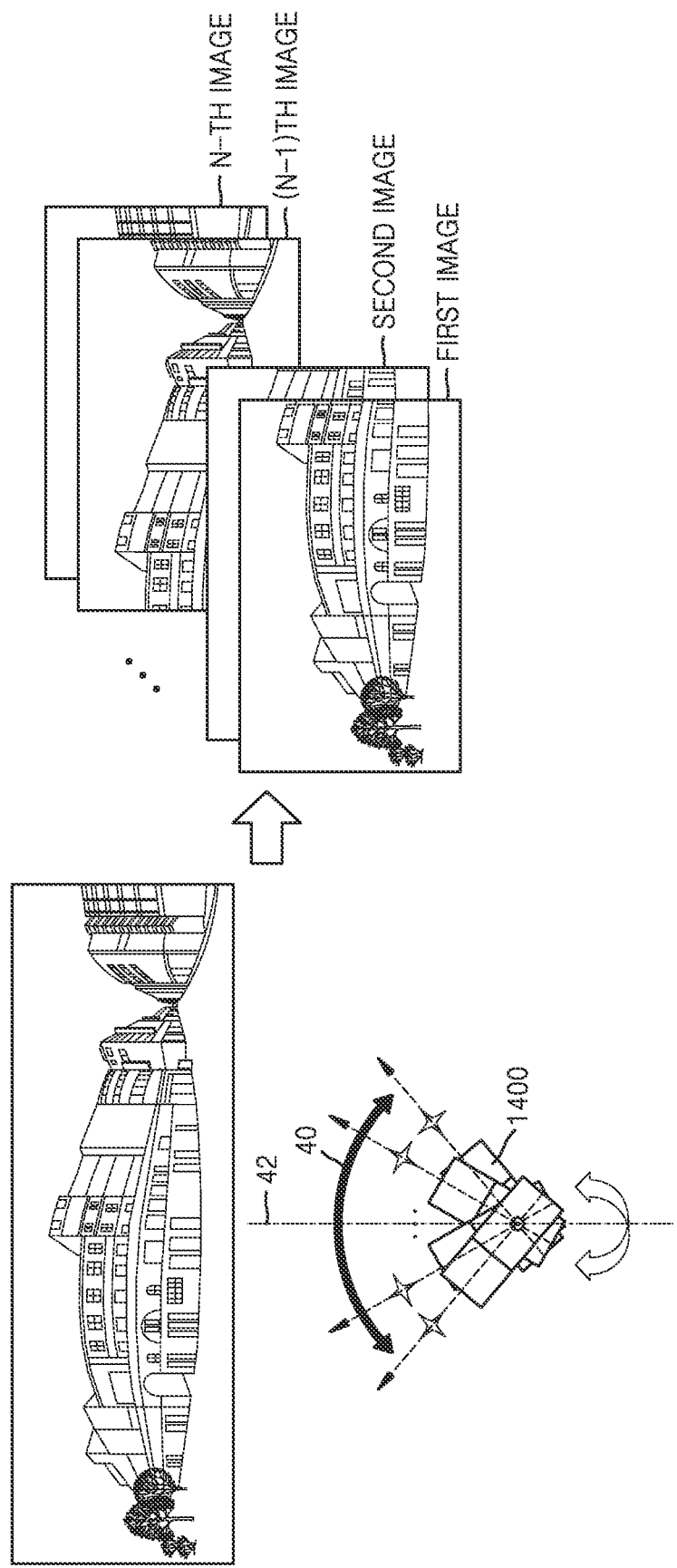
FIG. 4A is a diagram showing an example in which a camera module in a device obtains a plurality of images while rotating, according to an embodiment of the present disclosure.

FIG. 4A is a diagram showing an example, in which a camera module in a device according to an embodiment of the present disclosure obtains a plurality of images while rotating.

Referring to FIG. 4A, the camera module 1400 in the device 1000 may sequentially photograph the periphery of the device 1000 while rotating in the clockwise or counter-clockwise direction by a certain angle within a certain photographing angle range 40. For example, the device 1000 may sequentially photograph the periphery of the device 1000 while rotating the camera module 1400, for example, by 5° angle in the clockwise direction. The photographing angle range 40 of the camera module 1400 may be differently set according to the photographing mode of the device 1000. For example, when the photographing mode of the device 1000 is a gesture recognition mode, the photographing angle range 40 may be set to be a range from −15° to +15° based on a reference axis 42. Also, for example, when the photographing mode of the device 1000 is the space recognition mode, the photographing angle range 40 may be set to be a range from −30° to +30° based on the reference axis 42. The reference axis 42 may be determined according to the photographing direction of the camera module 14000 when the camera module 1400 faces the front surface of the device 1000.

The device 1000 may obtain first to n-th images by photographing the periphery of the device 1000 by using the camera module 1400. In this case, adjacent images from among the first to n-th images may partially overlap each other.

Figure 4B:
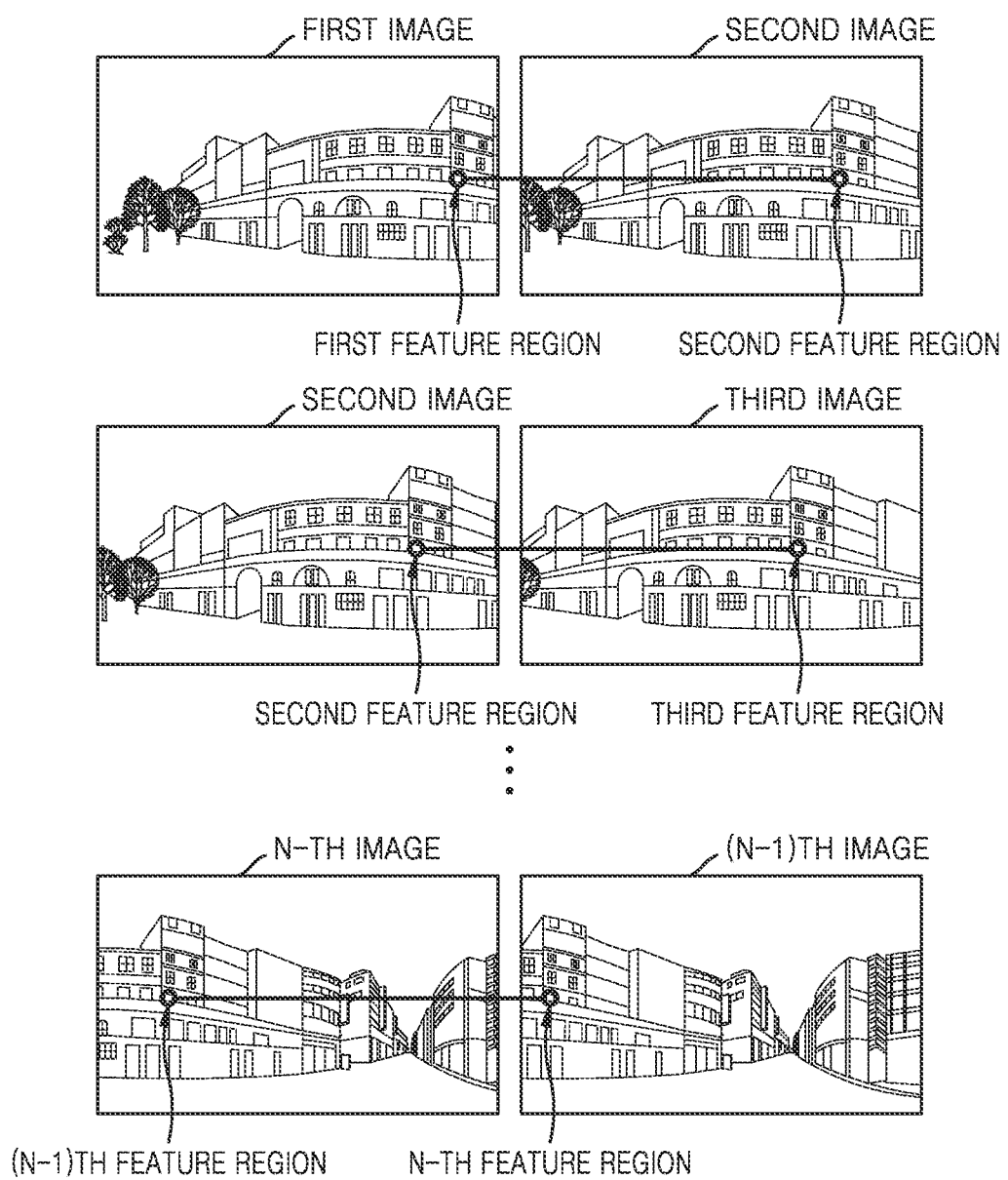
FIG. 4B is a diagram showing an example in which identical feature regions in adjacent images are sequentially identified according to an embodiment of the present disclosure.

FIG. 4B is a diagram showing an example in which identical feature regions in adjacent images are sequentially identified according to an embodiment of the present disclosure.

Referring to FIG. 4B, the device 1000 may identify the identical feature regions in the images through a stereo matching method. The device 1000 may identify that the first feature region in the first image is identical with the second feature region in the second image. Also, the device 1000 may identify that the second feature region in the second image is identical with the third feature region in the third image. As described above, the device 1000 may identify that an (n-1)th feature region in an (n-1)th image is identical with an n-th feature region in an n-th image by sequentially comparing two adjacent images.

Figure 4C:
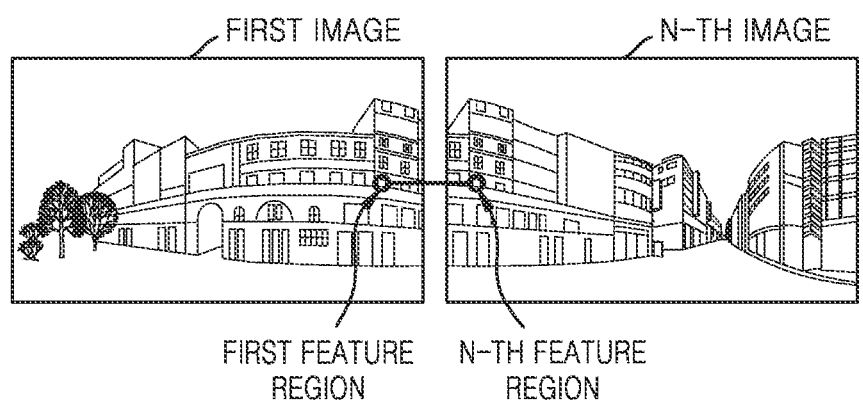
FIG. 4C is a diagram showing an example in which the device identifies identical identification regions in images having the largest angle difference, according to an embodiment of the present disclosure.

FIG. 4C is a diagram showing an example in which the device according to an embodiment of the present disclosure identifies identical identification regions ("first feature region" and "n-th feature region") in images having the largest angle difference, such as the first image and the n-th image.

Referring to FIG. 4C, the device 1000 may identify that the first feature region in the first image is identical with the n-th feature region in the n-th image, based on the identification result of FIG. 4B. Accordingly, the device 1000 may identify the identical feature regions in two images having the largest photographing angle difference, from among the first to n-th images, and may accurately calculate the depth of the feature region that will be described later.

The adjacent images may have a lot of overlapping regions, and the identical feature regions in the adjacent images are represented at similar locations in the adjacent images. Thus, the device 1000 may identify the identical feature regions more efficiently by comparing the adjacent images. For example, the first image overlaps the second image more than any other images, and the location of the first feature region in the first image is less different from the location of the second feature region in the second image. Thus, the device 1000 may accurately identify that the first feature region and the second feature region are identical with each other even when relatively smaller regions in the first and second images are compared. Also, the device 1000 may sequentially compare the adjacent images, and may use the sequentially compared results to more accurately identify that the first feature region in the first image is identical with the n-th feature region in the n-th image.

In FIGS. 4A to 4C, it is described that the device 1000 identify the identical feature regions in the image by using all of the captured images, but one or more embodiments are not limited thereto. The device 1000 may select a plurality of images, that is, some of the captured images, and compares the selected plurality of images to identify the identical feature regions in the plurality of selected images. For example, from among the first to n-th images, third to n-3rd images are selected, and adjacent images from among the third to n-3rd images are compared so as to identify that the third feature region in the third image and an n-3rd feature region in the n-3rd image are identical with each other.

In FIGS. 4A to 4C, it is described that the device 1000 identifies the same feature regions from the first image that is captured at the smallest photographing angle within the photographing angle range and the n-th image that is captured at the largest photographing angle within the photographing angle range, but one or more embodiments are not limited thereto. The device 1000 identifies the same feature regions from two images having a photographing angle difference that is equal to or greater than a certain critical value, and the depths of the feature regions may be calculated by using the identified feature regions. For example, the device 1000 may select the first image and the n-3rd image having a photographing angle difference that is equal to or greater than a certain critical value from among the first to n-th images, and may identify the same feature regions from the first and n-3rd images.

Figure 5A:
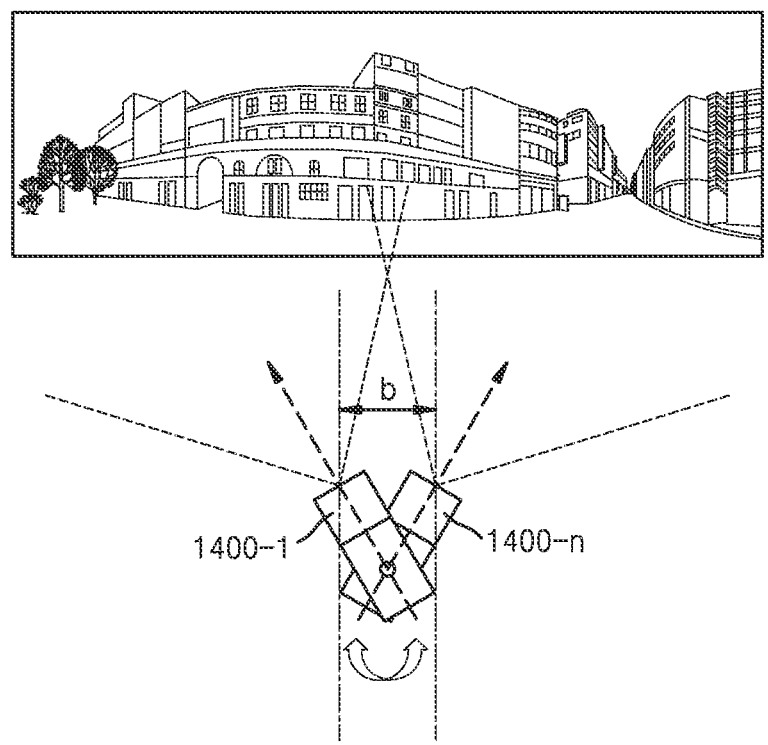
FIG. 5A is a diagram showing an example in which a device photographs a periphery thereof, according to an embodiment of the present disclosure.
Figure 5B:
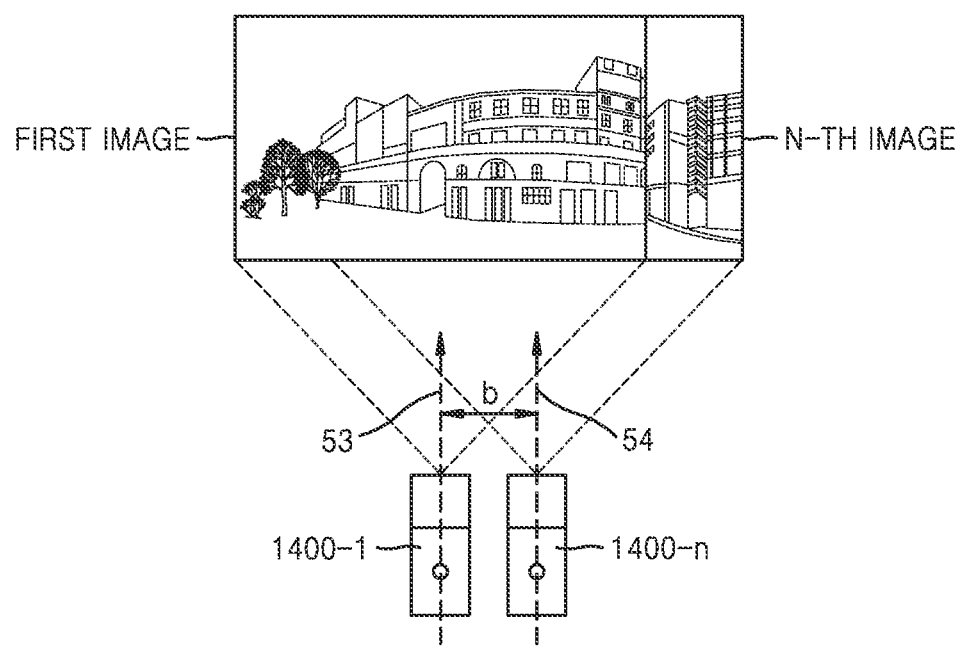
FIG. 5B is a diagram showing an example, in which a device virtually arranges a camera module, according to an embodiment of the present disclosure.
Figure 5C:
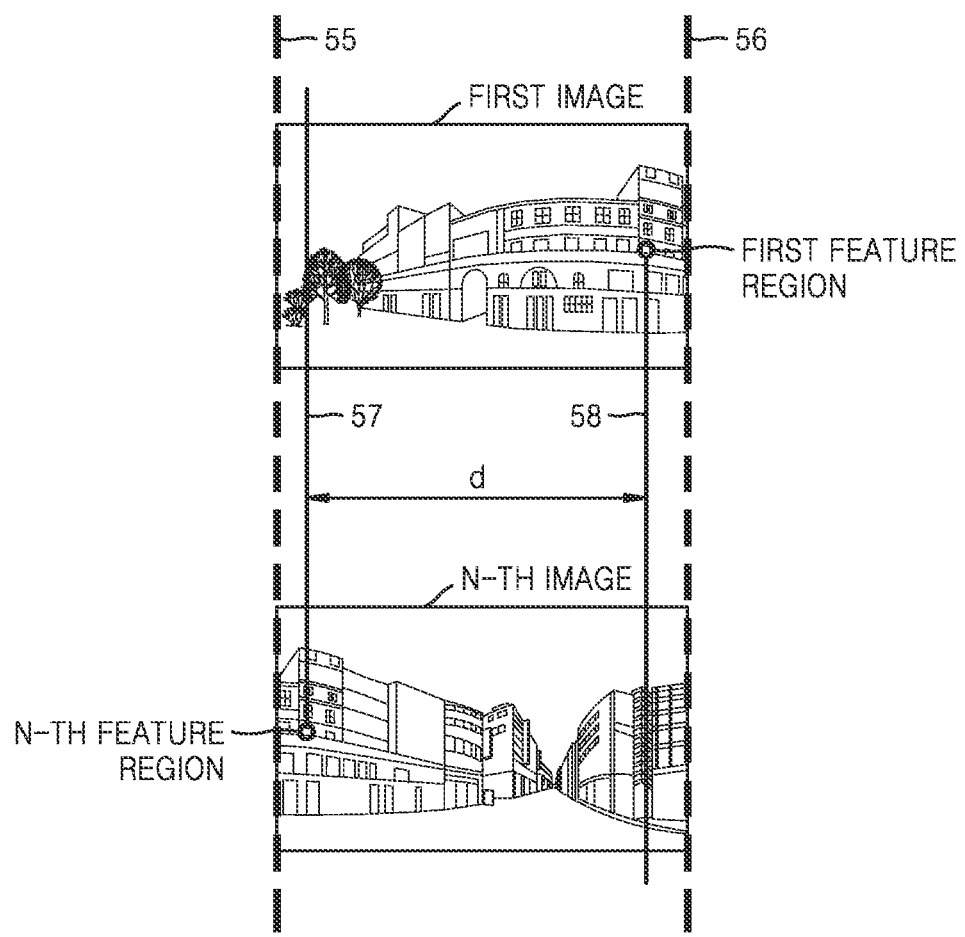
FIG. 5C is a diagram showing an example in which a device calculates a disparity value, according to an embodiment of the present disclosure.

FIGS. 5A to 5C are diagrams for describing an example in which the device according to an embodiment of the present disclosure arranges captured images and obtains a disparity value of a feature region.

FIG. 5A is a diagram showing an example in which a device according to an embodiment of the present disclosure captures images of a periphery thereof.

Referring to FIG. 5A, the device 1000 may sequentially photograph the periphery of the device 1000 at certain photographing angle intervals within the photographing angle range. Also, a base line value "b" with respect to the first image and the n-th image may be determined due to the photographing center of a camera module 1400-1 when the first image is captured and the photographing center of a camera module 1400-n when the n-th image is captured, wherein the first image and the n-th image have the largest difference within the photographing angle range. For example, a distance between a lens center of the camera module 1400-1 when the first image is captured and a lens center of the camera module 1400-n when the n-th image is captured may denote the base line value "b".

FIG. 5B is a diagram showing an example, in which a device according to an embodiment of the present disclosure virtually arranges a camera module.

Referring to FIG. 5B, the device 1000 may virtually arrange the camera module 1400-1 when the first image is captured and the camera module 1400-n when the n-th image is captured, so that a photographing direction 53 of the camera module 1400-1 when the first image is captured and a photographing direction 54 of the camera module 1400-n when the n-th image is captured may be parallel to each other while maintaining the base line value b between the camera module 1400-1 when the first image is captured and the camera module 1400-n when the n-th image is captured.

FIG. 5C is a diagram showing an example in which a device according to an embodiment of the present disclosure calculates a disparity value.

Referring to FIG. 5C, the device 1000 may arrange the first image and the n-th image in order to a disparity value "d" between the identical feature regions in the first image and the n-th image. For example, the device 1000 may arrange the first image and the n-th image along a longitudinal axis 55 and a longitudinal axis 56, respectively. Also, for example, longitudinal sides of the first image and the n-th image and the longitudinal axis 55 and the longitudinal axis 56 may not match. In this case, the device 1000 may rectify the first image and the n-th image according to a certain algorithm (e.g., the stereo matching algorithm) so that the longitudinal sides of the first and n-th images and the longitudinal axis 55 and the longitudinal axis 56 may be matched.

Also, the device 1000 may calculate the disparity value "d" between the first and n-th feature regions, on the basis of the location of the first feature region in the first image and the n-th feature region in the n-th image. For example, the disparity value "d" between the first feature region and the n-th feature region may be determined according to a distance between a longitudinal line 57 crossing the first feature region and a longitudinal line 58 crossing the n-th feature region.

Figure 6:
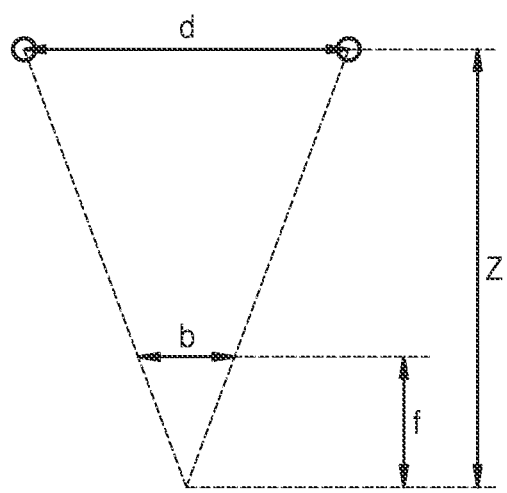
FIG. 6 is a diagram showing an example in which a device calculates a depth of a feature region, according to an embodiment of the present disclosure.

FIG. 6 is a diagram showing an example in which a device according to an embodiment of the present disclosure calculates a depth of a certain region.

Referring to FIG. 6, the depth of the identical feature regions in the two images may be calculated by using the disparity value "d" with respect to the identical feature regions in the two images, the base line value of the camera module 1400, and the focal length of the camera module 1400. For example, a depth "z" of the feature region may be calculated as Equation 1 below, based on that a ratio between the depth "z" of the feature region and a focal length f of the camera module 1400 is equal to a ratio between the disparity value d and the base line value b.

Depth of a feature region $(z)=\{$disparity value $(d) \times$ focal length $(f)\}/$base line value $b$. [Equation 1]

For example, in Equation 1 above, the depth z of the feature region denotes the depths of the first feature region and the n-th feature region that are the identical feature region in one image, and the disparity value "d" denotes a disparity value with respect to the first feature region and the n-th feature region in the image. The base line value "b" denotes the distance between the lens center of the camera module 1400 capturing the first feature region and the lens center of the camera module 1400 capturing the n-th feature region, and the focal length "f" may denote the focal length of the camera module 1400 when the first and n-th feature regions are captured.

Figure 7:
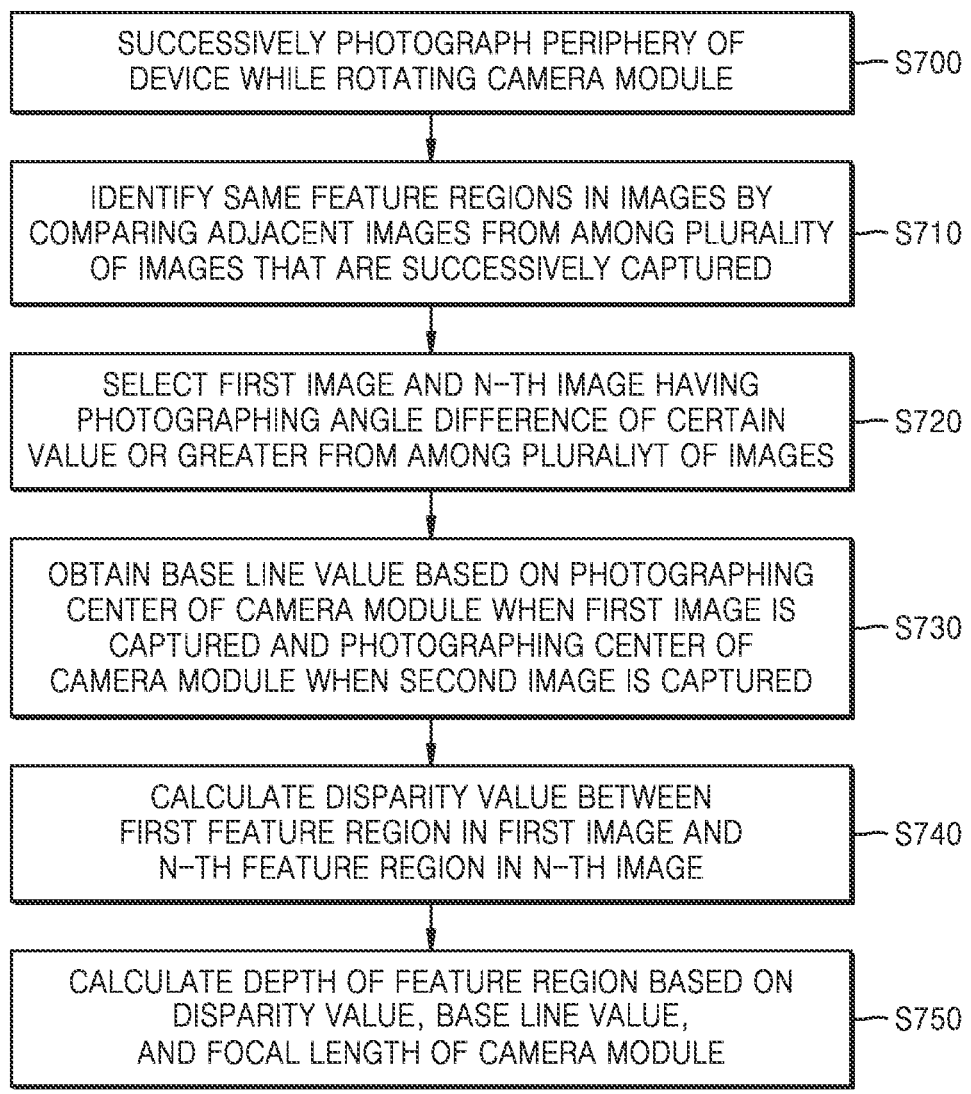
FIG. 7 is a flowchart illustrating a method of calculating a depth of a feature region in an image, according to an embodiment of the present disclosure.

FIG. 7 is a flowchart illustrating a method of calculating, by a device according to an embodiment of the present disclosure, a depth of a feature region in an image.

In operation S700, the device 1000 may successively photograph the periphery of the device 1000 (e.g., a peripheral object in front of the device 1000) while rotating the camera module 1400. The device 1000 may obtain a plurality of images by sequentially photographing the periphery of the device 1000 according to the determined photographing interval within the recognized photographing angle range, by controlling the camera module 1400 and the photographing direction controller 1500. The camera module 1400 may photograph the periphery of the device 1000 a plurality of times according to the photographing interval while rotating within the photographing angle range. From among the images captured by the camera module 1400, adjacent images may partially overlap each other.

In operation S710, the device 1000 may identify the same feature regions in the images, by comparing adjacent images from among the plurality of captured images. The device 1000 may identify that the first feature region in the first image is identical with the second feature region in the second image. Also, the device 1000 may identify that the second feature region in the second image is identical with the third feature region in the third image. As described above, the device 1000 may identify that an (n-1)th feature region in an (n-1)th image is identical with an n-th feature region in an n-th image by sequentially comparing two adjacent images.

In operation S720, the device 1000 may select the first image and the n-th image from among the plurality of images, wherein the first image and the n-th image have a photographing angle difference that is equal to or greater than a certain value. For example, when n images are captured, the first image that is captured with the smallest photographing angle and the n-th image that is captured with the largest photographing angle within the photographing angle range may be selected, but are not limited thereto. The device 1000 identifies the same feature regions from two images having a photographing angle difference that is equal to or greater than a certain critical value, and the depths of the feature regions may be calculated by using the identified feature regions. For example, the device 1000 may select the first image and the n-3rd image having a photographing angle difference that is equal to or greater than a certain critical value from among the first to n-th images, and may identify the same feature regions from the first and n-3rd images.

In operation S730, the device 1000 may obtain a base line value based on the photographing center of the camera module 1400 when the first image is captured and the photographing center of the camera module 1400 when the second image is captured. The base line value may refer to a value indicating a distance between a photographing center of the camera module 1400 when one image is captured and a photographing center of the camera module 1400 when another image is captured. The photographing center of the camera module 1400 may refer to, for example, a central point of a lens in the camera module 1400.

In operation S740, the device 1000 may calculate a disparity value between the first feature region in the first image and the n-th feature region in the n-th image. The device 1000 may virtually arrange the camera module when the first image is captured and the camera module when the n-th image is captured while maintaining the base line value, and may arrange the first image and the second image according to a certain criterion. Also, the device 1000 may calculate the disparity value between the first and n-th feature regions, on the basis of the location of the first feature region in the first image and the n-th feature region in the n-th image.

In operation S750, the device 1000 may calculate the depth of the feature region on the basis of the disparity value, the base line value, and the focal length of the camera module. The device 1000 may calculate the depth of the identical feature regions in the two images by using the disparity value with respect to the identical feature regions in the two images, the base line value of the camera module 1400, and the focal length of the camera module 1400. The device 1000 may calculate the depth of the feature region by using the factor that a ratio between the base line value and the focal length is equal to a ratio between the disparity value and the depth.

Figure 8:
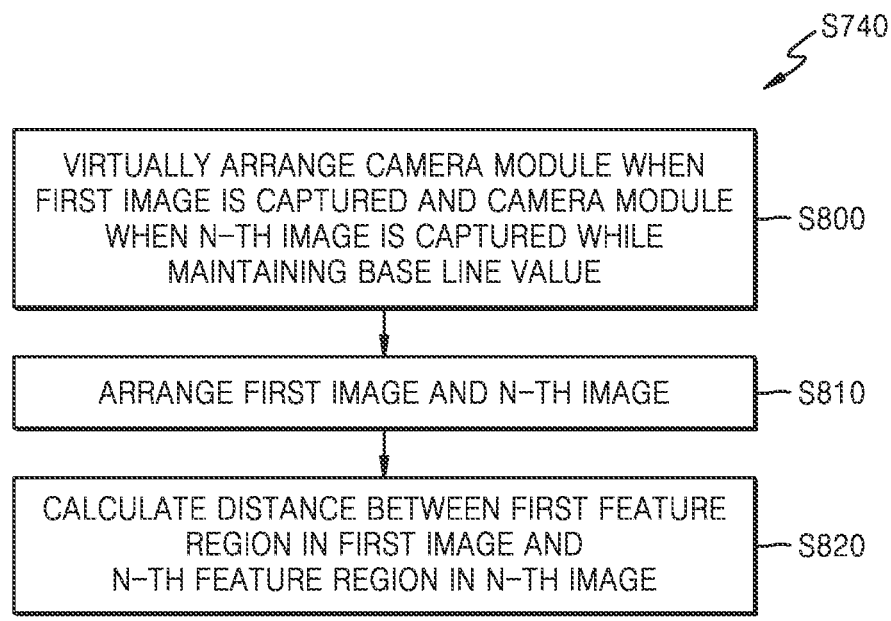
FIG. 8 is a diagram showing an example in which a device according to an embodiment of the present disclosure calculates a disparity value.

FIG. 8 is a diagram showing an example in which a device according to an embodiment of the present disclosure calculates a disparity value.

In operation S800, the device 1000 may arrange the camera module 1400-1 when the first image is captured and the camera module 1400-n when the n-th image is captured while maintaining the base line value, for example, as illustrated in FIG. 5B. The device 1000 may arrange the camera module 1400-1 when the first image is captured and the camera module 1400-n when the n-th image is captured, so that the photographing direction of the camera module 1400-1 capturing the first image and the photographing direction of the camera module 1400-n capturing the n-th image may be parallel to each other.

In operation S810, the device 1000 may arrange the first image and the n-th image. The device 1000 may arrange the first image and the n-th image along a longitudinal axis 55 and a longitudinal axis 56, respectively. When the longitudinal sides of the first image and the n-th image do not match with the longitudinal axis 55 and the longitudinal axis 56, the device 1000 may rectify the first image and the n-th image according to a certain algorithm so that the longitudinal sides of the first and n-th images may match with the longitudinal axis 55 and the longitudinal axis 56.

In operation S820, the device 1000 may calculate a distance between the first feature region in the first image and the n-th feature region in the n-th image. The device 1000 may calculate the distance between the first feature region and the n-th feature region, on the basis of the location of the first feature region in the first image arranged in operation S820 and the location of the second feature region in the second image arranged in operation S820.

Figure 9:
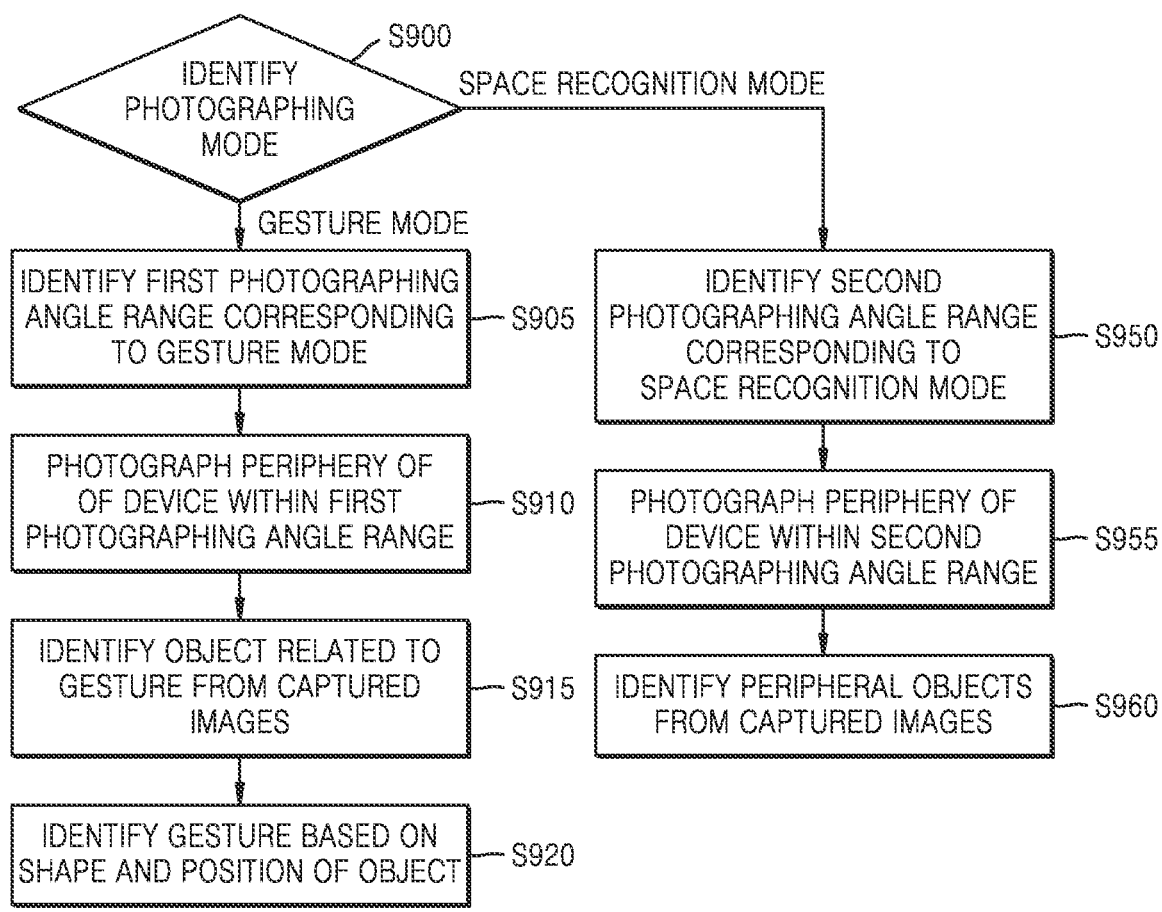
FIG. 9 is a flowchart illustrating a method of recognizing a periphery of the device according to a photographing mode, according to an embodiment of the present disclosure.

FIG. 9 is a flowchart illustrating a method of recognizing, by a device according to an embodiment of the present disclosure, a periphery of the device according to a photographing mode.

In operation S900, the device 1000 may identify the photographing mode. For example, when the device 1000 is turned on or the device 1000 is activated from an inactivated state, the device 1000 may identify the photographing mode of the camera module 1400 as the gesture recognition mode for receiving a gesture input of the user. Also, the device 1000 may recognize the gesture of the user in the gesture recognition mode and may change the photographing mode of the camera module 1400 according to the recognized gesture. The device 1000 may execute an application corresponding to the gesture and may change the photographing mode of the camera module 1400 according to the photographing mode required by the application that is being executed. Also, for example, the device 1000 may inactivate the camera module 1400 when an application that does not require the photographing operation through the camera module 1400 is executed.

Alternatively, for example, when the device 1000 is turned on or the device 1000 is activated from the inactivated state, the device 1000 may identify the photographing mode of the camera module 1400 as the space recognition mode.

Also, for example, when the processor 1800 receives a preset user input for the device 1000, the processor 1800 may identify the photographing mode of the camera module 1400 as the gesture recognition mode or the space recognition mode.

When it is identified that the photographing mode is the gesture recognition mode as a result of identification in operation S900, the device 1000 may identify a first photographing angle range corresponding to the gesture recognition mode in operation S905. For example, when the photographing mode of the camera module 1400 is the gesture recognition mode, the camera module 1400 may be set to photograph the periphery of the device 1000 within a photographing angle range of −15° to 15°. For example, when it is assumed that an angle while the camera module 400 faces the front is 0°, the camera module 1400 may rotate by −15° angle to the left and by 15° angle to the right on the basis of the front surface in the case in which the photographing angle range of the camera module 1400 is −15° to 15°.

In operation S910, the device 1000 may photograph the periphery of the device 1000 within the first photographing angle range. The device 1000 may obtain a plurality of images by sequentially photographing the periphery of the device 1000 according to a certain photographing interval within the first photographing angle range, by controlling the camera module 1400 and the photographing direction controller 1500. In this case, the device 1000 may determine the photographing interval of the camera module 1400.

In operation S915, the device 1000 may identify objects related to the gesture from the captured images. The device 1000 may calculate depth values of feature regions regarding various objects in the captured images and may compare the calculated depth values. The device 1000 may identify the objects related to the gesture of the user, by comparing the calculated depth values. Also, the device 1000 may identify a shape and a location of the identified object.

In operation S920, the device 1000 may identify the gesture based on the shape and location of the object. The device 1000 may identify the gesture of the user based on a change in the object shape and a change in the object location.

When it is identified that the photographing mode is the space recognition mode as a result of identification in operation S900, the device 1000 may identify a second photographing angle range corresponding to the space recognition mode in operation S950. For example, when the photographing mode of the camera module 1400 is the space recognition mode, the camera module 1400 may be set to photograph the periphery of the device 1000 within a photographing angle range of −60° to 60°. For example, when it is assumed that an angle while the camera module 400 faces the front is 0°, the camera module 1400 may rotate by −60° angle to the left and by 60° angle to the right on the basis of the front surface in the case in which the photographing angle range of the camera module 1400 is −60° to 60°.

In operation S955, the device 1000 may photograph the periphery of the device 1000 within the second photographing angle range. The device 1000 may obtain a plurality of images by sequentially photographing the periphery of the device 1000 according to a certain photographing interval within the second photographing angle range, by controlling the camera module 1400 and the photographing direction controller 1500. In this case, the device 1000 may determine the photographing interval of the camera module 1400.

In operation S960, the device 1000 may identify peripheral objects from the captured images. The device 1000 may calculate depth values of feature regions regarding various objects in the captured images and may compare the calculated depth values. The device 1000 may recognize the peripheral space of the device 1000 by identifying the objects around the device 1000, by comparing the calculated depth values.

According to an embodiment, the device 1000 may identify an object that the user sees. When pupils of the user are fixed for a certain time period or more, the device 1000 may sequentially photograph the periphery of a direction in which the user watches while rotating the camera module 1400 within a certain photographing angle range. Also, the device 1000 may generate a depth map of the periphery of the direction seen by the user, and may identify the object seen by the user. Also, the device 1000 may display additional information about the identified object. The additional information may include, for example, an identification value of the object and a depth value of the object, but is not limited thereto. The device 1000 may display a graphical user interface (GUI) for providing the user with the additional information about the identified object.

Figure 10A:
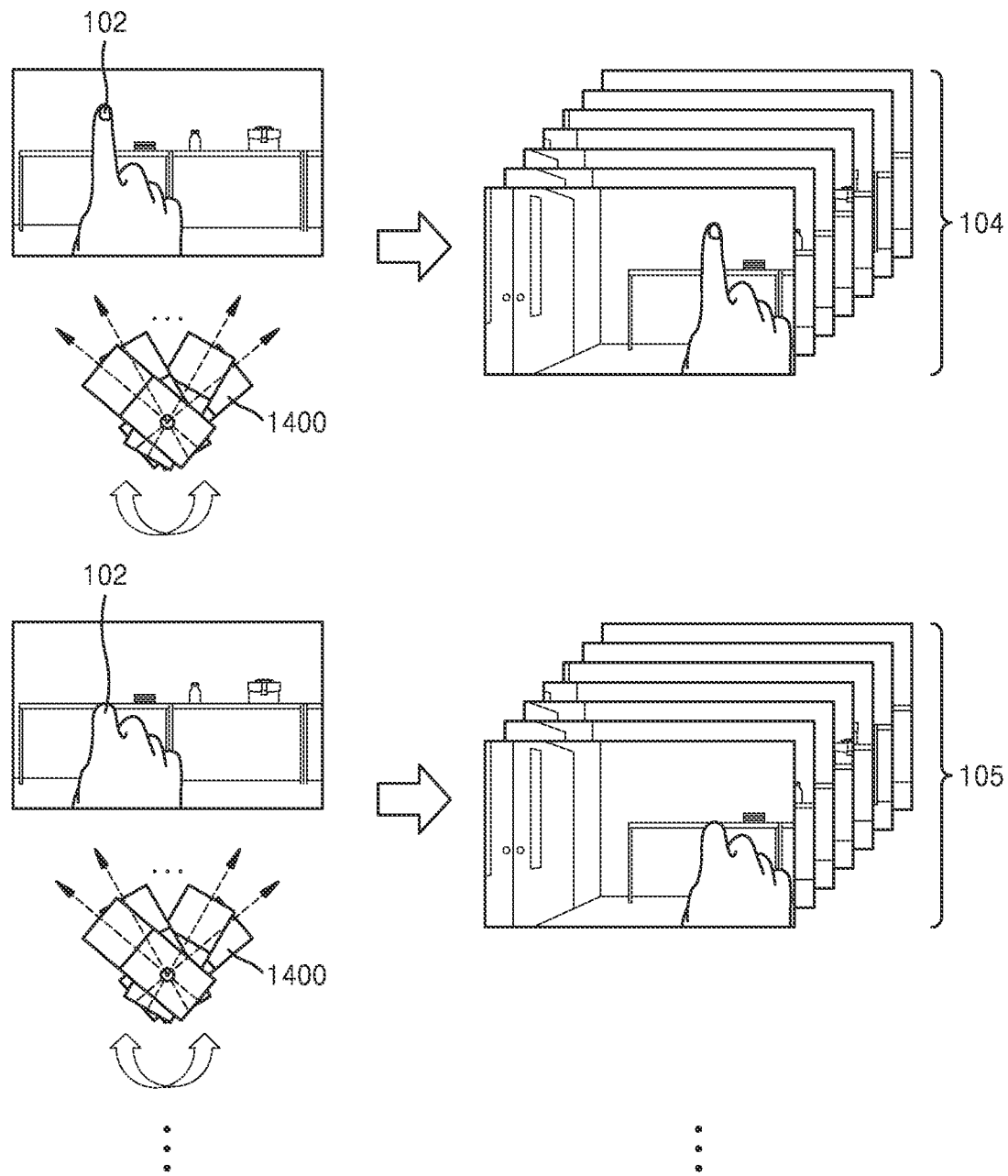
FIG. 10A is a diagram showing an example in which a device photographs a hand gesture of a user in a gesture recognition mode, according to an embodiment of the present disclosure.

FIG. 10A is a diagram showing an example in which a device according to an embodiment of the present disclosure captures an image of a hand gesture of a user in a gesture recognition mode.

Referring to FIG. 10A, the user may execute a gesture of bending a finger 102, and the device 1000 may sequentially photograph the finger 102 that is bending a plurality of times in a gesture recognition mode. For example, the device 1000 may sequentially photograph the finger 102 while rotating the camera module 1400 a plurality of times at a certain photographing interval within the first photographing angle range corresponding to the gesture recognition mode. Accordingly, the device 1000 may obtain a plurality of image sets including n images. For example, the device 1000 may obtain a first image set 104 that is captured while the finger 102 is stretched, and a second image set 105 captured while the finger 102 is bent.

Figure 10B:
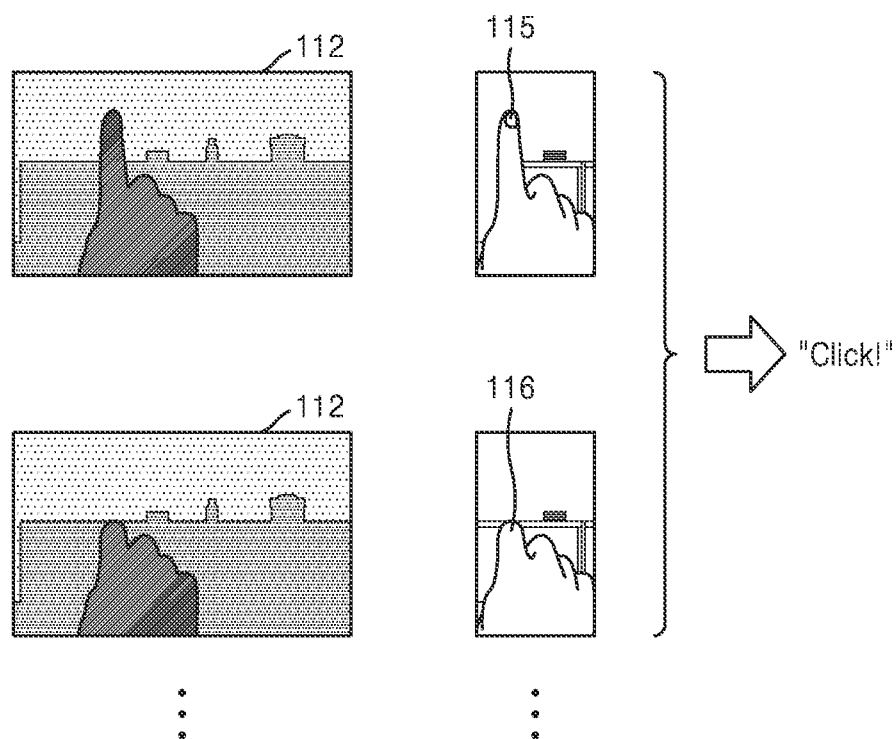
FIG. 10B is a diagram showing an example in which a device recognizes a gesture from a set of images, according to an embodiment of the present disclosure.

FIG. 10B is a diagram showing an example in which a device according to an embodiment of the present disclosure recognizes a gesture from a set of images.

Referring to FIG. 10B, the device 1000 may generate a first depth map 112 from the first image set 104 captured while the finger 102 is stretched, and a second depth map 113 from the second image set 105 captured while the finger 102 is bent.

Also, the device 1000 may identify a stretched finger 115 from the first depth map and a bent finger 116 from the second depth map 113. After that, the device 1000 identify that the gesture of the user is a clicking motion, by analyzing a shape of the stretched finger 115 and a shape of the bent finger 116.

Figure 11A:
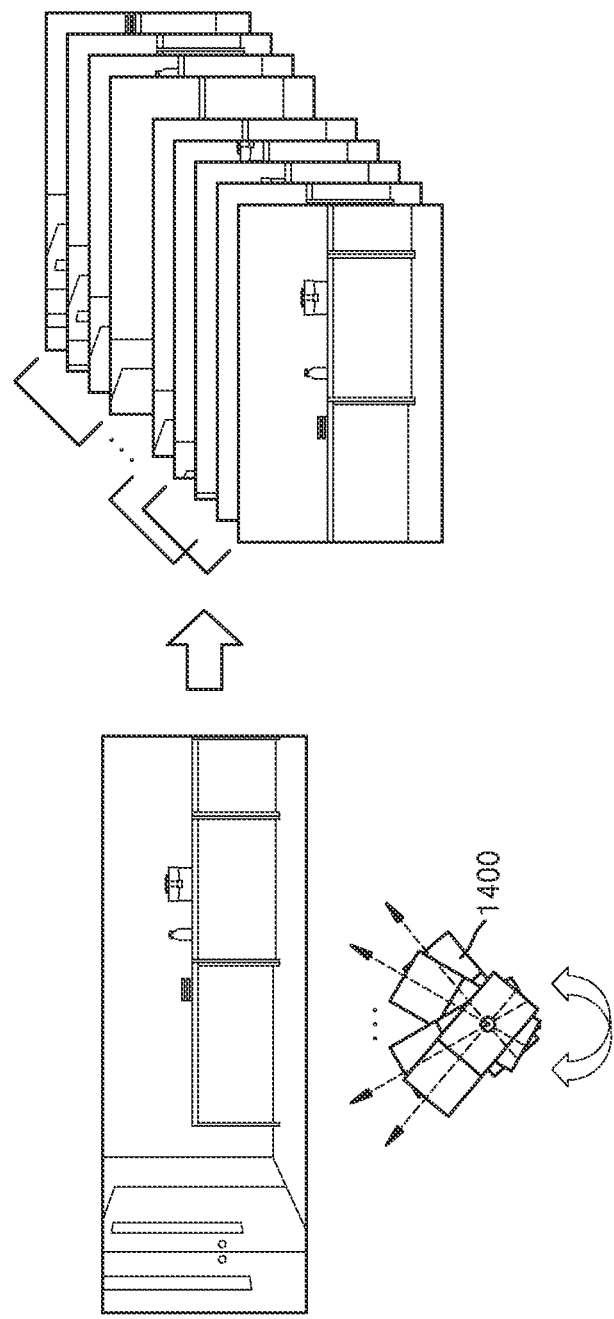
FIG. 11A is a diagram showing an example in which a device performs grouping of a plurality of images obtained by photographing the periphery of the device into a plurality of image sets, according to an embodiment of the present disclosure.

FIGS. 11A to 11O are diagrams showing an example in which a device according to an embodiment of the present disclosure analyzes a space around the device.

FIG. 11A is a diagram showing an example in which a device according to an embodiment of the present disclosure performs grouping of a plurality of images obtained by photographing the periphery of the device into a plurality of image sets.

Referring to FIG. 11A, the device 1000 may sequentially photograph the periphery of the device 1000 while rotating the camera module 1400 a plurality of times at certain photographing intervals within the second photographing angle range corresponding to the space recognition mode. Also, the device 1000 may obtain a plurality of image sets by grouping adjacent images from among the plurality of images. The plurality of image sets may each consist of successive images. Some of the successive images in the image set may overlap some of the successive images in the adjacent image set.

Figure 11B:
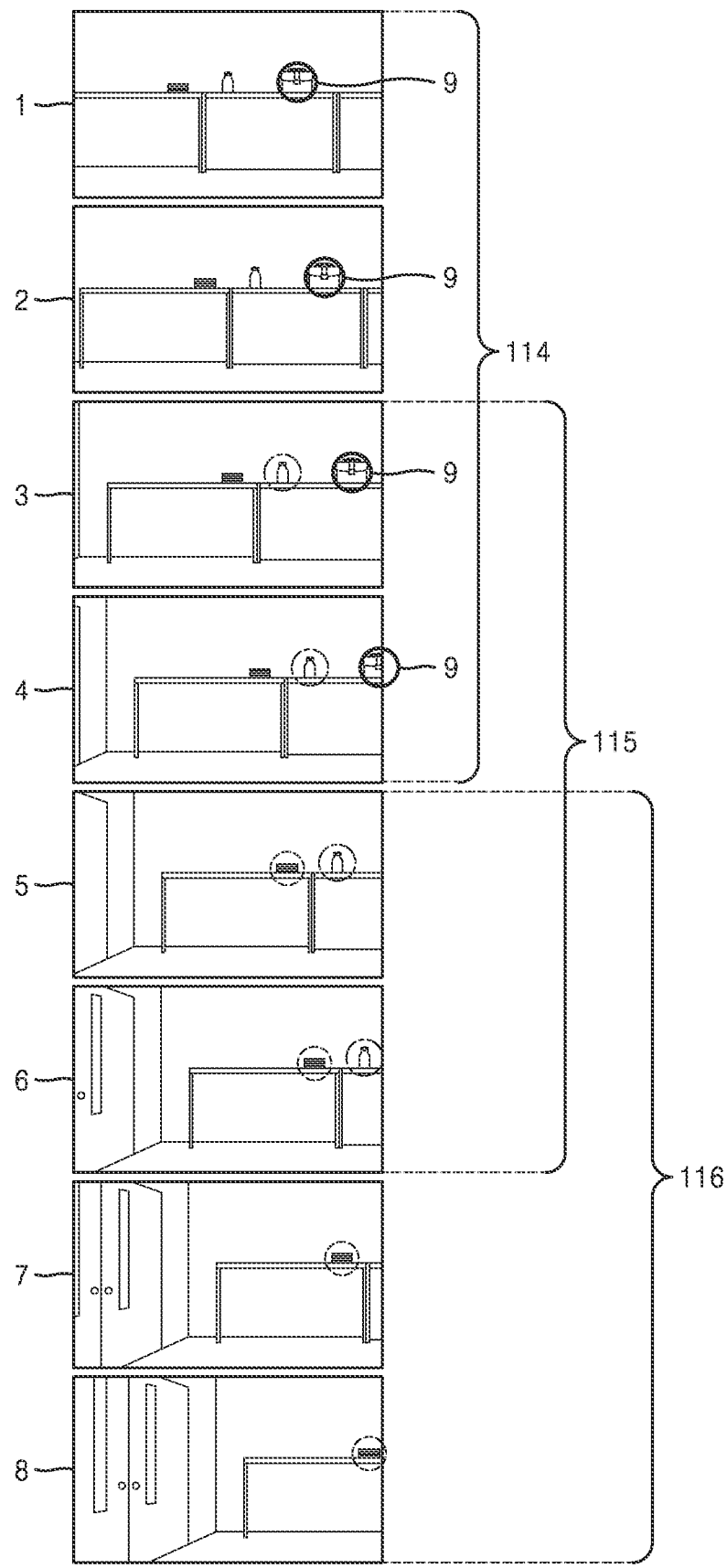
FIG. 11B is a diagram showing an example of a plurality of image sets grouped by a device according to an embodiment of the present disclosure.

FIG. 11B is a diagram showing an example of a plurality of image sets grouped by a device according to an embodiment of the present disclosure.

Referring to FIG. 11B, the device 1000 may obtain a first image set 114, a second image set 115, and a third image set 116 from the plurality of images obtained by photographing the periphery of the device 1000. The first image set 114 may include an image 1, an image 2, an image 3, and an image 4, the second image set 115 may include the image 3, the image 4, an image 5, and an image 6, and the third image set 116 may include the image 5, the image 6, an image 7, and an image 8.

In addition, a feature region 9 may not exist in the image 5, but exists in the images of the first image set 114, and the device 1000 may calculate a depth value of the feature region 9 from the first image set 114.

Figure 11C:
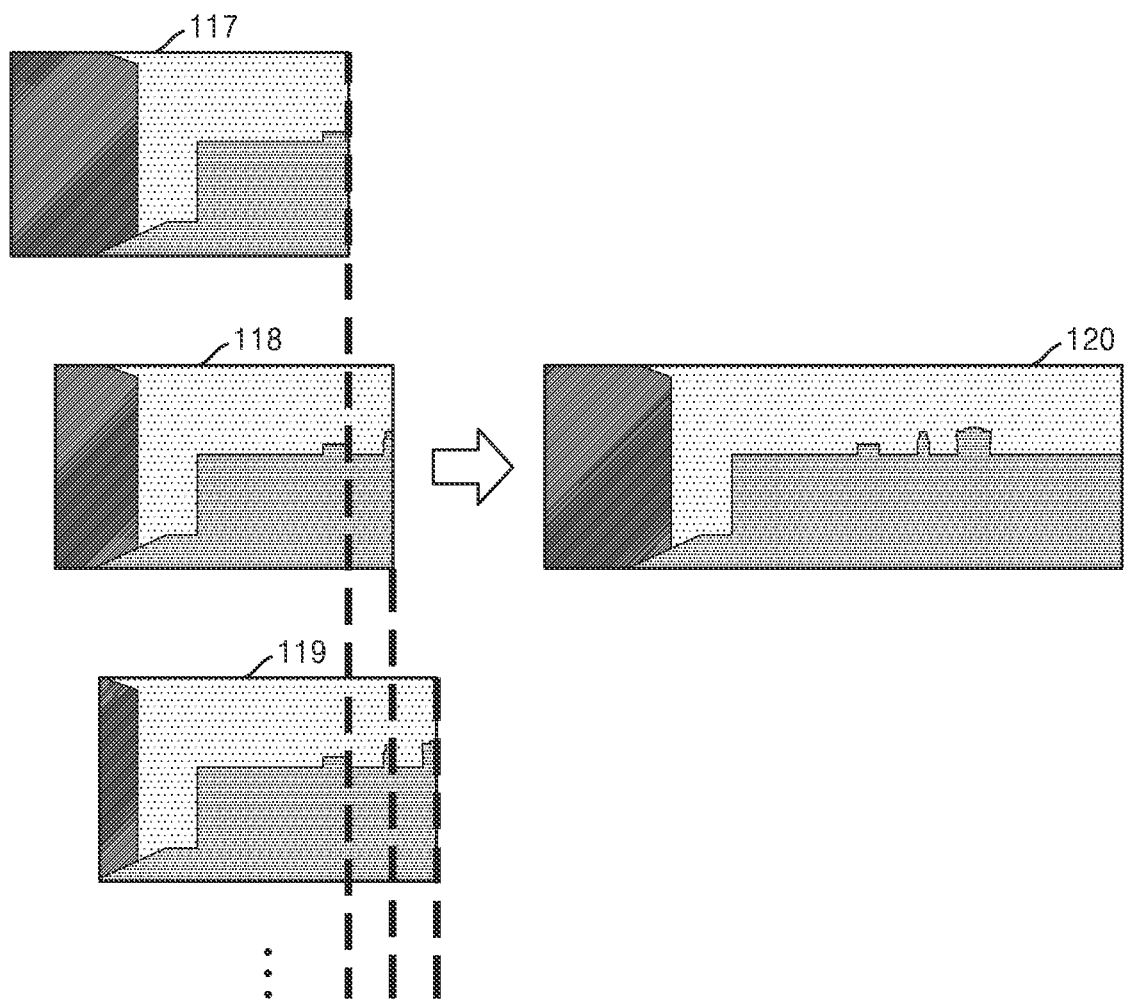
FIG. 11C is a diagram showing an example in which a device generates and analyzes a depth map representing a peripheral space of the device from a depth map generated from a plurality of image sets, according to an embodiment of the present disclosure.

FIG. 11C is a diagram showing an example in which a device according to an embodiment of the present disclosure generates and analyzes a depth map representing a peripheral space of the device from a depth map generated from a plurality of image sets.

Also, the device 1000 may generate a first partial depth map 117 from the first image set 114, a second partial depth map 118 from the second image set 115, and a third partial depth map 119 from the third image set 116. Also, the device 1000 may generate and analyze an entire depth map 120 by using the first partial depth map 117, the second partial depth map 118, and the third partial depth map 119.

An embodiment of the disclosure may be embodied in a storage medium including instruction code executable by a computer or processor such as a program module executed by the computer. The computer-readable storage medium may be any available medium that may be accessed by a computer, and includes volatile and non-volatile media and removable and non-removable media. Also, the computer-readable medium may include both a computer storage medium and a communication medium. The computer storage medium may include volatile and non-volatile media and removable and non-removable media that are implemented using any method or technology for storing information, such as computer-readable instructions, a data structure, a program module, or other types of data. The communication medium typically includes computer-readable instructions, a data structure, a program module, or other data of modulated data signal.

In addition, the computer-readable storage medium may be provided in the form of a non-transitory storage medium. Here, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium. For example, the 'non-transitory storage medium' may include a buffer in which data is temporarily stored.

According to an embodiment, the method according to various embodiments disclosed in the present document may be provided to be included in a computer program product. The computer program product may be traded between a seller and a buyer as a product. The computer program product may be distributed in the form of a machine-readable storage medium e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product (e.g., downloadable app) may be temporarily generated or at least temporarily stored in the machine-readable storage medium, such as memory of the manufacturer's server, a server of the application store, or a relay server.

In addition, the terms such as " . . . unit", etc. provided herein may be realized by a hardware component such as a processor or a circuit, and/or a software component executed by a hardware component such as a processor.

Throughout the present specification, the expression 'at least one of a, b or c' indicates only a, only b, only c, both a and b, both a and c, both b and c, all of a, b, and c, or variations thereof.

AI-related functions according to the disclosure are performed using a processor and a memory. The processor may include one or more processors. In this case, the one or more processors may be general-purpose processors such as a central processing unit (CPU), an application processor (AP), and a digital signal processor (DSP), dedicated graphics processors such as a graphics processing unit (GPU) and a vision processing unit (VPU), or dedicated AI processors such as a numeric processing unit (NPU). The one or more processors control processing of input data based on a predefined operation rule or AI model stored in the memory. Alternatively, when the one or more processors include the AI processors, the AI processor may be designed as a hardware structure specified to process a certain AI model.

The predefined operation rule or AI model is made through training. Here, being made through training denotes that a basic AI model is trained based on multiple pieces of training data by using a learning algorithm and thus a predefined operation rule or AI model configured to achieve desired characteristics (or purposes) is made. The training may be performed by a device having an AI function according to the disclosure, or by a separate server and/or system. The learning algorithm may include, for example, supervised learning, unsupervised learning, semi-supervised learning, or reinforcement learning, but is not limited thereto.

The AI model may include a plurality of neural network layers. Each of the plurality of neural network layers has a plurality of weight values and performs neural network calculation through calculation between a calculation result of a previous layer and the plurality of weight values. The plurality of weight values of the plurality of neural network layers may be optimized by a result of training the AI model. For example, the plurality of weight values may be modified to reduce or minimize a loss value or a cost value obtained by the AI model during the training process. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

The AI model according to the present disclosure may use image data as input data of the AI model and may output data that is a result of recognizing an image or a feature region in the image. The AI model may be made through training.

Visual recognition technology, which is a technology for recognizing and processing objects in the manner of human vision, includes object recognition, object tracking, image retrieval, human recognition, scene understanding, spatial understanding, and image enhancement.

The above description of the disclosure is provided for the purpose of illustration, and it would be understood by those skilled in the art that various changes and modifications may be made without changing technical conception and essential features of the disclosure. Thus, the embodiments of the disclosure set forth herein or shown above are to be interpreted in an illustrative and non-limiting sense. For example, each component described to be of a single type can be implanted in a distributed manner. Likewise, components described to be distributed can be implanted in a combined manner.

The scope of the disclosure is defined by the following claims rather than by the detailed description of the embodiment of the disclosure. It shall be understood that all modifications and embodiments conceived from the meaning and scope of the claims and their equivalents are included in the scope of the disclosure.

What is claimed is:

1. A method, performed by an electronic device comprising a camera, of obtaining a depth of a feature region, the method comprising:
    obtaining a plurality of images by photographing an external environment of the camera of the electronic device a plurality of times while sequentially rotating the camera by a preset angle;
    identifying a first feature region in a first image and an n-th feature region in an n-th image by comparing adjacent images between the first image and the n-th image from among the plurality of images, the n-th feature region being identical to the first feature region;
    obtaining a base line value with respect to the first image and the n-th image, based on a first arrangement of the camera when the first image is captured and a second arrangement of the camera when the n-th image is captured;
    obtaining a disparity value between the first feature region and the n-th feature region, based on a position of the first feature region in the first image and a position of the n-th feature region in the n-th image; and
    determining a depth of the first feature region or the n-th feature region, based on at least the base line value and the disparity value,
    wherein the disparity value is directly proportional to the depth, and
    wherein the base line value is inversely proportional to the depth.

2. The method of claim 1, wherein the obtaining the plurality of images comprises sequentially photographing the external environment of the camera while panning the camera at certain angle intervals within a certain photographing angle range.

3. The method of claim 1, wherein the identifying of the first feature region and the n-th feature region further comprises identifying feature regions that are identical with the first feature region, from among the feature regions in the first image to the n-th image, by sequentially comparing adjacent images with each other from among the first image to the n-th image of the plurality of images.

4. The method of claim 1, wherein a photographing angle of the camera is changed when the camera sequentially rotates by the preset angle, and
    the base line value with respect to the first image and the n-th image is determined based on a distance value between a location of a camera lens of the camera when the first image is captured and a location of the camera lens of the camera when the n-th image is captured.

5. The method of claim 1, wherein the obtaining the disparity value further comprises:
    virtually arranging the camera when the first image is captured and the camera when the n-th image is captured such that a first photographing direction of the camera when the first image is captured and a second photographing direction of the camera when the n-th image is captured are parallel to each other;
    arranging the first image and the n-th image based on the first photographing direction of the camera and the second photographing direction of the camera; and
    obtaining a distance value between the first feature region in the arranged first image and the arranged n-th feature region in the n-th image.

6. The method of claim 5, wherein the arranging the camera comprises virtually arranging the camera when the first image is captured and the camera when the n-th image is captured while maintaining the base line value with respect to the first image and the n-th image.

7. The method of claim 1, wherein the determining the depth comprises determining the depth based on the base line value, the disparity value, and focal lengths of the camera when the first image and the n-th image are captured.

8. The method of claim 1, further comprising:
    determining a photographing mode of the camera; and
    identifying a photographing angle range set according to the photographing mode,
    wherein the obtaining the plurality of images comprises obtaining the plurality of images while sequentially rotating the camera by the preset angle within the identified photographing angle range.

9. The method of claim 8, wherein the photographing mode comprises at least one of a gesture recognition mode for identifying a gesture of a user around the camera and a space recognition mode for recognizing a space around the camera.

10. The method of claim 1, wherein the obtaining the plurality of images further comprises determining a focal length of the camera, and
    the determining the depth of the first feature region or the n-th feature region comprises determining the depth of the first feature region or the n-th feature region based on the base line value, the disparity value, and the focal length of the camera.

11. An electronic device comprising:
    a camera;
    a photographing direction controller configured to rotate the camera;
    a display;
    a memory storing one or more instructions; and
    a processor configured to execute the one or more instructions to:
        obtain a plurality of images by controlling the photographing direction controller and the camera to photograph an external environment of the camera a plurality of times while sequentially rotating the camera by a preset angle,
        identify a first feature region in a first image and an n-th feature region in an n-th image by comparing adjacent images between the first image and the n-th image from among the plurality of images, the n-th feature region being identical to the first feature region,
        obtain a base line value with respect to the first image and the n-th image, based on a first arrangement of the camera when the first image is captured and a second arrangement of the camera when the n-th image is captured, obtain a disparity value between the first feature region and the n-th feature region based on a position of the first feature region in the first image and a position of the n-th feature region in the n-th image, and determine a depth of the first feature region or the n-th feature region at least based on at least the base line value and the disparity value, wherein the disparity value is directly proportional to the depth, and wherein the base line value is inversely proportional to the depth.

12. The electronic device of claim 11, wherein the processor is further configured to execute the one or more instructions to sequentially photograph the external environment of the camera while panning the camera at certain angle intervals within a certain photographing angle range.

13. The electronic device of claim 11, wherein the processor is further configured to execute the one or more instructions to identify feature regions that are identical with the first feature region, from among the feature regions in the first image to the n-th image, by sequentially comparing adjacent images with each other from among the first image to the n-th image of the plurality of images.

14. A electronic device of claim 11, wherein a photographing angle of the camera is changed when the camera sequentially rotates by the preset angle, and the base line value with respect to the first image and the n-th image is determined based on a distance value between a first location of a camera lens of the camera when the first image is captured and a second location of the camera lens of the camera when the n-th image is captured.

15. The electronic device of claim 11, wherein the processor is further configured to execute the one or more instructions to:

determine a focal length of the camera, and determine the depth of the first feature region or the n-th feature region based on the base line value, the disparity value, and the focal length of the camera.

16. A non-transitory computer-readable recording medium having recorded thereon a program, which when executed by a computer, performs the method of claim 1.

* * * * *